(12) United States Patent
Browning et al.

(10) Patent No.: US 10,941,503 B2
(45) Date of Patent: *Mar. 9, 2021

(54) WHITE APPEARING ANODIZED FILMS

(71) Applicant: Apple Inc., Cupertino, CA (US)

(72) Inventors: Lucy E. Browning, San Francisco, CA (US); Stephen B. Lynch, Portola Valley, CA (US); Christopher D. Prest, San Francisco, CA (US); Peter N. Russell-Clarke, San Francisco, CA (US); Masashige Tatebe, Kakogawa (JP); Michael S. Nashner, San Jose, CA (US); Daniel T. McDonald, San Jose, CA (US); Brian S. Tryon, Redwood City, CA (US); Jody R. Akana, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/215,417

(22) Filed: Dec. 10, 2018

(65) Prior Publication Data

US 2019/0106803 A1 Apr. 11, 2019

Related U.S. Application Data

(60) Continuation of application No. 14/622,443, filed on Feb. 13, 2015, now Pat. No. 10,184,190, which is a (Continued)

(51) Int. Cl.
  *C25D 11/18* (2006.01)
  *B23K 26/352* (2014.01)
  (Continued)

(52) U.S. Cl.
  CPC .......... *C25D 11/18* (2013.01); *B23K 26/354* (2015.10); *B23K 26/355* (2018.08);
  (Continued)

(58) Field of Classification Search
  None
  See application file for complete search history.

(56) References Cited

U.S. PATENT DOCUMENTS 3,747,117 A 7/1973 Fechter
3,765,994 A 10/1973 Quaintance et al.
(Continued)

FOREIGN PATENT DOCUMENTS

CN 85103365 A 12/1986
CN 1336878 A 2/2002
(Continued)

OTHER PUBLICATIONS

Chinese Application Patent No. 201480059602.2—Second Office Action dated Sep. 27, 2017.
(Continued)

*Primary Examiner* — David Sample
(74) *Attorney, Agent, or Firm* — Dorsey & Whitney LLP

(57) ABSTRACT

The embodiments described herein relate to forming anodized films that have a white appearance. In some embodiments, an anodized film having pores with light diffusing pore walls created by varying the current density during an anodizing process is described. In some embodiments, an anodized film having light diffusing micro-cracks created by a laser cracking procedure is described. In some embodiments, a sputtered layer of light diffusing aluminum is provided below an anodized film. In some embodiments, light diffusing particles are infused within openings of an anodized layer.

20 Claims, 29 Drawing Sheets

Related U.S. Application Data division of application No. 14/240,252, filed as application No. PCT/US2013/047163 on Jun. 21, 2013, now Pat. No. 8,993,921.

(60) Provisional application No. 61/702,202, filed on Sep. 17, 2012, provisional application No. 61/701,568, filed on Sep. 14, 2012, provisional application No. 61/663,515, filed on Jun. 22, 2012.

(51) Int. Cl.
| | | |
|---|---|---|
| B23K 26/354 | (2014.01) | |
| C25D 11/04 | (2006.01) | |
| C25D 11/02 | (2006.01) | |
| C25D 11/12 | (2006.01) | |

(52) U.S. Cl.
CPC ............ C25D 11/024 (2013.01); C25D 11/04 (2013.01); C25D 11/045 (2013.01); C25D 11/12 (2013.01); *Y10T 428/13* (2015.01); *Y10T 428/24331* (2015.01); *Y10T 428/24471* (2015.01)

(56) References Cited

U.S. PATENT DOCUMENTS

| | | |
|---|---|---|
| 4,210,499 A | 7/1980 | Hirono et al. |
| 4,519,876 A | 5/1985 | Lee et al. |
| 4,753,863 A | 6/1988 | Spanjer |
| 4,972,061 A | 11/1990 | Duley et al. |
| 5,472,788 A | 12/1995 | Benitez-Garriga |
| 5,510,015 A | 4/1996 | Martinez et al. |
| 6,054,225 A | 4/2000 | Harayama et al. |
| 6,083,871 A | 7/2000 | Fromson et al. |
| 6,127,050 A | 10/2000 | Fromson et al. |
| 6,139,713 A | 10/2000 | Masuda et al. |
| 6,180,415 B1 | 1/2001 | Schultz et al. |
| 6,238,847 B1 | 5/2001 | Axtell et al. |
| 6,271,162 B1 | 8/2001 | Haug et al. |
| 6,548,264 B1 | 4/2003 | Tan et al. |
| 6,613,161 B2 | 9/2003 | Zheng et al. |
| 6,777,098 B2 | 8/2004 | Yeo |
| 6,821,305 B2 | 11/2004 | Yan |
| 6,866,710 B2 | 3/2005 | Heider et al. |
| 6,884,336 B2 | 4/2005 | Kia et al. |
| 7,144,627 B2 | 12/2006 | Halas et al. |
| 7,173,276 B2 | 2/2007 | Choi et al. |
| 7,187,396 B2 | 3/2007 | Carroll, Jr. et al. |
| 7,314,649 B2 | 1/2008 | Karunaratne et al. |
| 8,029,554 B2 | 10/2011 | Holman et al. |
| 8,993,921 B2 | 3/2015 | Browning et al. |
| 9,181,629 B2 | 11/2015 | Browning et al. |
| 9,403,293 B2 | 8/2016 | Isurugi et al. |
| 9,487,879 B2 * | 11/2016 | Tatebe .................. C25D 11/24 |
| 9,493,876 B2 | 11/2016 | Browning et al. |
| 9,839,974 B2 | 12/2017 | McDonald et al. |
| 10,017,872 B2 | 7/2018 | Browning et al. |
| 10,184,190 B2 | 1/2019 | Browning et al. |
| 10,434,602 B2 * | 10/2019 | McDonald ........... B23K 26/354 |
| 2002/0132105 A1 | 9/2002 | Robertson et al. |
| 2002/0171732 A1 | 11/2002 | Carroll, Jr. et al. |
| 2003/0001150 A1 | 1/2003 | Iwasaki et al. |
| 2003/0176563 A1 | 9/2003 | Kuroda et al. |
| 2004/0194235 A1 | 10/2004 | Yan |
| 2005/0069683 A1 | 3/2005 | Aylward et al. |
| 2005/0175836 A1 | 8/2005 | Kuehnle et al. |
| 2005/0211566 A1 | 9/2005 | Tomita et al. |
| 2006/0066579 A1 | 3/2006 | Bladt |
| 2006/0197953 A1 | 9/2006 | Perez et al. |
| 2006/0254922 A1 | 11/2006 | Brevnov et al. |
| 2006/0260947 A1 | 11/2006 | Kia et al. |
| 2007/0141342 A1 | 6/2007 | Kuehnle et al. |
| 2007/0190298 A1 | 8/2007 | Hampden-Smith et al. |
| 2007/0281140 A1 | 12/2007 | Haubrich et al. |
| 2007/0284261 A1 | 12/2007 | Shimotani et al. |
| 2008/0026207 A1 | 1/2008 | Fink-Petri et al. |
| 2008/0057293 A1 | 3/2008 | Hatanaka et al. |
| 2008/0073220 A1 | 3/2008 | Doyle |
| 2008/0274375 A1 | 11/2008 | Ng et al. |
| 2009/0022995 A1 | 1/2009 | Graham et al. |
| 2009/0120358 A1 | 5/2009 | Harada et al. |
| 2009/0130436 A1 | 5/2009 | Harada et al. |
| 2009/0181262 A1 | 7/2009 | Isaksson et al. |
| 2009/0323171 A1 | 12/2009 | Gibson |
| 2010/0015558 A1 | 1/2010 | Jarvis et al. |
| 2010/0183869 A1 | 7/2010 | Lin et al. |
| 2010/0187119 A1 | 7/2010 | Almond et al. |
| 2010/0215926 A1 | 8/2010 | Askin et al. |
| 2010/0224026 A1 | 9/2010 | Fournet et al. |
| 2011/0008602 A1 | 1/2011 | Peeters |
| 2011/0123737 A1 | 5/2011 | Nashner |
| 2011/0193928 A1 | 8/2011 | Zhang |
| 2011/0284381 A1 | 11/2011 | Cabot et al. |
| 2012/0021120 A1 | 1/2012 | Feldstein |
| 2012/0091495 A1 | 4/2012 | Hatanaka et al. |
| 2013/0075126 A1 * | 3/2013 | Nashner ............... B23K 26/355 174/50 |
| 2013/0224406 A1 | 8/2013 | Chang et al. |
| 2014/0076600 A1 | 3/2014 | Browning et al. |
| 2014/0193607 A1 | 7/2014 | Browning et al. |
| 2014/0209467 A1 | 7/2014 | Miao et al. |
| 2015/0090598 A1 | 4/2015 | Tatebe et al. |
| 2015/0118512 A1 | 4/2015 | Browning et al. |
| 2015/0132541 A1 | 5/2015 | McDonald et al. |
| 2015/0176146 A1 | 6/2015 | Browning et al. |
| 2015/0225867 A1 | 8/2015 | Tatebe et al. |
| 2016/0024680 A1 | 1/2016 | Browning et al. |
| 2018/0099352 A1 | 4/2018 | McDonald et al. |

FOREIGN PATENT DOCUMENTS

| | | |
|---|---|---|
| CN | 1596290 A | 3/2005 |
| CN | 101230474 A | 7/2008 |
| CN | 101275264 A | 10/2008 |
| CN | 102162115 A | 8/2011 |
| CN | 102460749 A | 5/2012 |
| CN | 102498240 A | 6/2012 |
| CN | 102834551 A | 12/2012 |
| CN | 103014706 A | 4/2013 |
| DE | 10134559 A1 | 2/2003 |
| EP | 993964 A2 | 4/2000 |
| EP | 1110660 A2 | 6/2001 |
| EP | 1967616 A1 | 9/2008 |
| EP | 2649224 | 10/2013 |
| JP | 60197897 A | 10/1985 |
| JP | 62020898 A | 1/1987 |
| JP | 63179098 A | 7/1988 |
| JP | 63206499 A | 8/1988 |
| JP | 01205094 A | 8/1989 |
| JP | 06317921 A | 11/1994 |
| JP | 10121292 A | 5/1998 |
| JP | 2009221140 A | 10/2009 |
| JP | 2010072616 A | 4/2010 |
| JP | 2013084954 A | 5/2013 |
| KR | 1020080031966 A | 4/2008 |
| KR | 1020080098331 A | 11/2008 |
| TW | 200524460 A | 7/2005 |
| TW | 200714747 A | 4/2007 |
| WO | 2011077899 A1 | 6/2011 |
| WO | 2012076467 A2 | 6/2012 |
| WO | 2014130451 A1 | 8/2014 |
| WO | 2014130452 A1 | 8/2014 |
| WO | 2014130453 A1 | 8/2014 |

OTHER PUBLICATIONS

Japanese Patent Application No. 2016-153985—Final Rejection Apr. 20, 2018.
Chinese Application for Invention No. 201711079453.8—First Office Action dated Dec. 28, 2018.
Chinese Application Patent No. 201480059602.2—Rejection Decision dated Dec. 28, 2018.

(56) References Cited

OTHER PUBLICATIONS

Chinese Application No. 201711079453.8—Second Office Action dated Sep. 16, 2019.
Furneaux et al.; "The formation of controlled-porosity membranes from anodically oxidized Aluminium", Nature, vol. 337, Jan. 1989, pp. 147-149.
Masuda; "Highly ordered metal nanohole arrays based on anodized alumina", Solid State Physics, vol. 31, No. 5, Dec. 1996, pp. 493-499.
International Search Report and Written Opinion for Application No. PCT/US2013/047163 dated Sep. 25, 2013.
Taiwanese Patent Application No. 104120036—Office Action dated Feb. 15, 2016.
Korean Patent Application No. 10-2015-7001318—Notice of Preliminary Rejection dated Feb. 28, 2016.
Japanese Patent Application No. 2015-518627—First Office Action dated Feb. 29, 2016.
Chinese Application for Invention No. 201380032781.6—First Office Action dated Apr. 27, 2016.
Hashimoto et al., "Ag Nanoparticle Films for Color Applications", Sep. 2011, Sep. 2011, Mater. Res. Symp. Proc., vol. 1343, pp. 1-6.
International Search Report and Written Opinion for Application No. PCT/US2013/059793 dated Dec. 23, 2013.
Wang et al.; "Tuning color by pore depth of metal-coated porous alumina-" Nanotechnology, vol. 22, No. 30, Art. No. 305306, pp. 1-6 (2011).
Huang et al.; "Optical characteristics of pore size on porous anodic aluminum oxide films with embedded silver nanoparticles." Sensors & Actuators A: Physical, vol. 180, pp. 49-54. (Apr. 7, 2012).
Hu et al.; "Photosensitive gold-nanoparticle-embedded dielectric nanowires-" Nature Materials vol. 5, No. 2, pp. 102-106 (2006).
Li et al..; "Brilliant and tunable color by changing pore diameter of metal-coated porous anodic alumina." SPIE Proceedings, vol. 8564, pp. 85640-1-85640-6 (Nov. 20, 2012).
International Search Report and Written Opinion for Application No. PCT/US14/051527 dated Nov. 24, 2014.
Sunada et al.; "Dielectric properties of Al—Si composite oxide films formed on electropolished and DC-etched aluminum by electrophoretic sol-gel coating and anodizing." J. Solid State Electrochem. vol. 11, No. 10:1375-1384 (Oct. 2007).
Chen et al.; "The effect of anodizing voltage on the electrical properties of Al-Ti composite oxide film on aluminum." J. Electroanalytic Chem. vol. 590, No. 1:26-31 (May 2006).
Korean Patent Application No. 2015-7001318—First Office Action dated Sep. 26, 2016.
Regone et al.; "Al-based anodic oxide films structure observation using filed emission gun scanning electron microscopy", Journal of Materials Processing Technology 172 (2006), 146-151, Received Dec. 10, 2004, 6 pages.
Curran et al.; "Thermo-physical properties of plasma electrolytic oxide coatings on aluminium", Surface and Coatings Technology, 199 (2005) 168-176, Available Online Feb. 26, 2015. 9 pages.
AlMawlawi, et. al. "Magnetic properties of Fe deposited into anodic aluminum oxide pores as a function of particle size", AIP Journal of Applied Physics, vol. 70, No. 8, Oct. 15, 1991, 4421-4425.
Chen et.al.; "Synthesis of anodizing composite films containing superfine Ah03 and PTFE particles on Al alloys", Applied Surface Science. 256, Apr. 20, 2010, pp. 6418-6525.
Chinese Application Patent No. 201480059602.2—Office Action dated Mar. 24, 2017.
European Patent Application No. 14857882.6—Extended European Search Report dated Jun. 21, 2017.
Vreeling et al., "Laser melt injection in aluminum alloys: on the role of the oxide skin", Acta Materialia., vol. 48, No. 17, Nov. 2000 (Nov. 2000), pp. 4225-4233, 9 pages.
Korean Patent Application No. 10-2017-7017085—Office Action dated Jul. 20, 2017.
Japanese Patent Application No. 2016-153985—Office Action dated Sep. 29, 2017.

\* cited by examiner

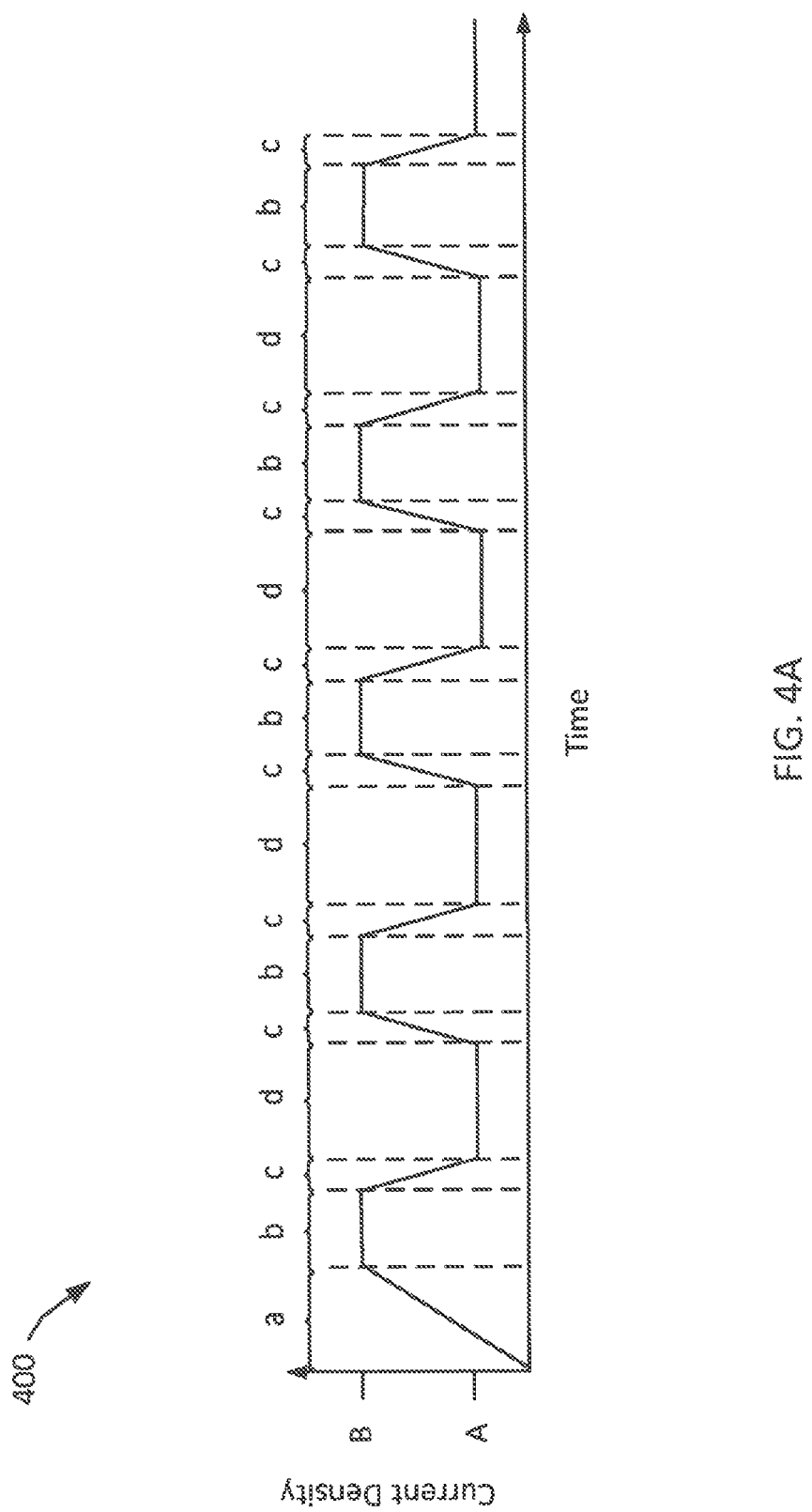

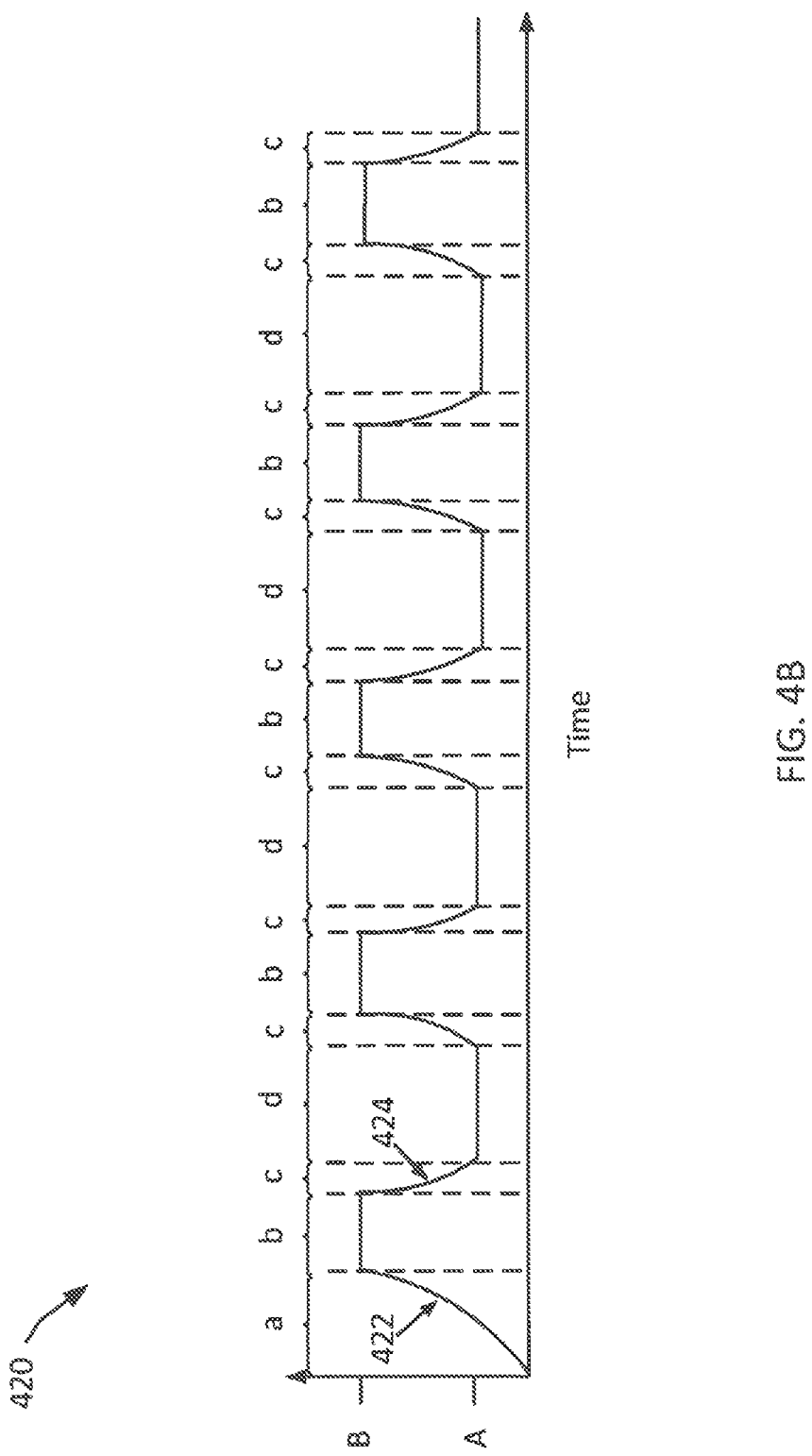

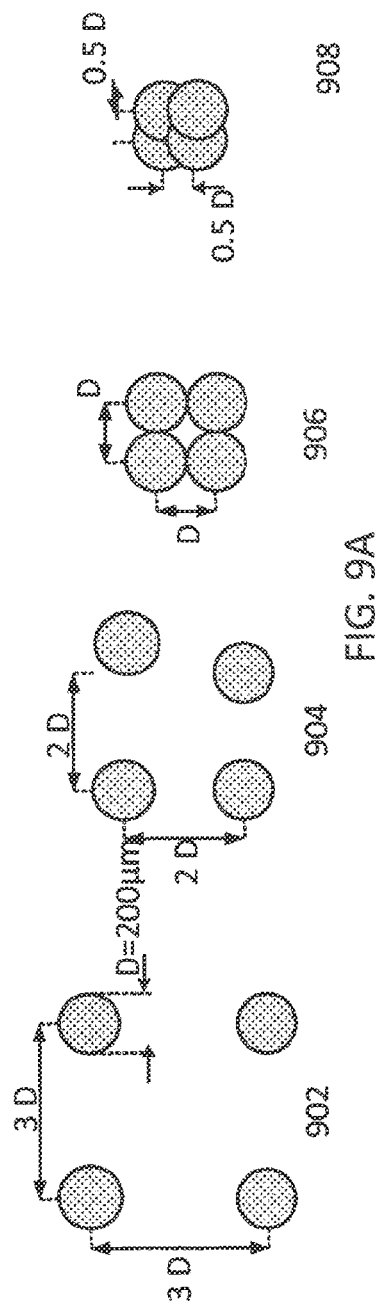
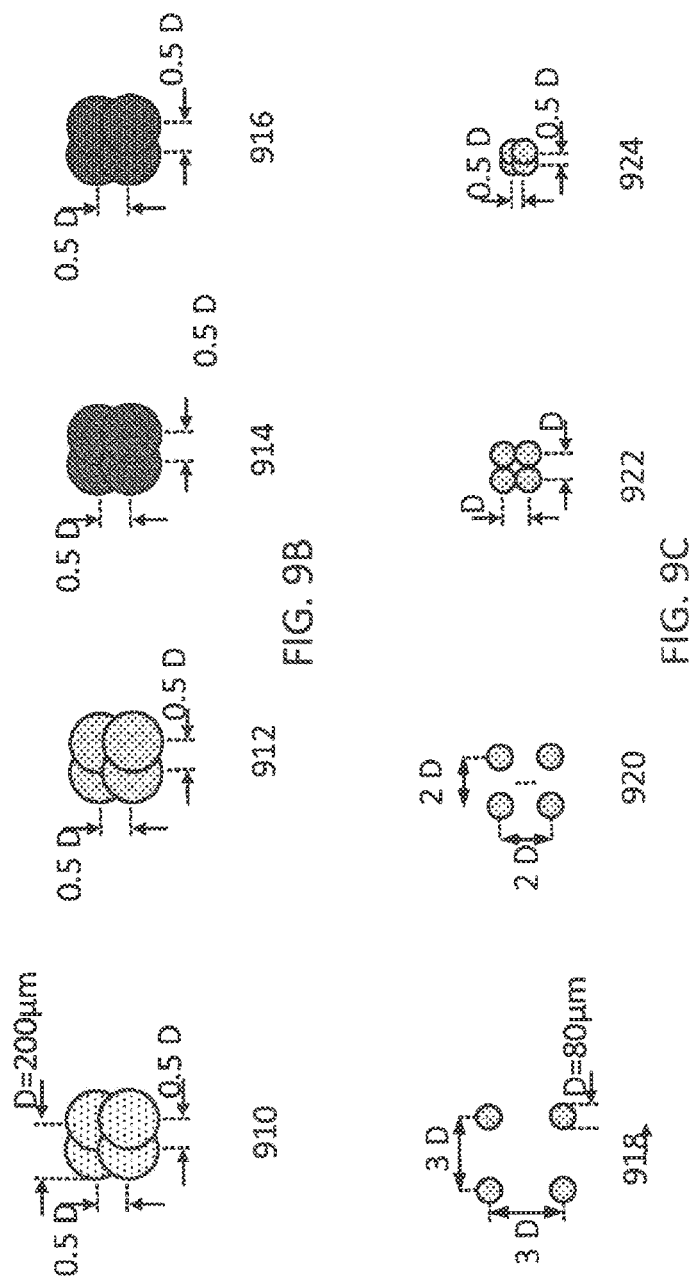
FIG. 9A
FIG. 9B
FIG. 9C

WHITE APPEARING ANODIZED FILMS

CROSS-REFERENCE TO RELATED APPLICATIONS

This is a continuation of U.S. patent application Ser. No. 14/622,443, entitled "WHITE APPEARING ANODIZED FILMS," filed Feb. 13, 2015, which is a divisional of U.S. patent application Ser. No. 14/240,252, entitled "Method of Forming White Appearing Anodized Films By Laser Beam Treatment," filed Feb. 21, 2014, issued as U.S. Pat. No. 8,993,921, which is a 35 U.S.C. § 371 national phase entry of PCT/US2013/047163, entitled "White Appearing Anodized Films And Methods For Forming The Same," filed Jun. 21, 2013, published as WO2013/192579, which claims priority to U.S. Provisional Application No. 61/663,515, entitled "Anodization," filed Jun. 22, 2012, U.S. Provisional Application No. 61/701,568, entitled "Anodization," filed Sep. 14, 2012, and U.S. Provisional Application No. 61/702,202, entitled "Anodization," filed Sep. 17, 2012, the contents of which are incorporated herein by reference in their entirety for all purposes.

FIELD

This disclosure relates generally to anodizing processes. More specifically, methods for producing an anodized film having a white appearance are disclosed.

BACKGROUND

Anodizing is an electrolytic passivation process used to increase the thickness of a natural oxide layer on a surface of metal parts where the part to be treated forms the anode electrode of an electrical circuit. Anodizing increases corrosion resistance and wear resistance, can provide better adhesion for paint primers and glues. The anodized film can also be used for a number of cosmetic effects. For example, techniques for colorizing anodized films have been developed that can provide an anodized film with a perceived color based, in part, upon a type and amount of light reflection at the anodized film surface. A particular color can be perceived when a light of a specific frequency is reflected off the surface of the anodized film.

In some cases, it can be desirable to form an anodized film having a white color. However, conventional attempts to provide a white appearing anodized film have resulted in anodized films that appear to be off-white, muted grey and milky white, and not a crisp and clean appearing white that many people find appealing.

SUMMARY

This paper describes various embodiments that relate to metal oxide films and methods for forming the same. Embodiments presented herein describe white appearing metal oxide films and methods for forming the same.

According to one embodiment, a method is described. The method involves sequentially varying a current density while forming a layer of aluminum oxide on an aluminum substrate. The layer of aluminum oxide is substantially opaque and reflects substantially all wavelengths of white light incident thereon.

According to another embodiment, a metal substrate is described. The metal substrate has a protective film disposed over an underlying metal surface. The protective film has a porous structure with a white appearance, the porous structure having a number of pores. At least a portion of the pores includes irregular pore walls having a number of sequentially repeating wide portions and narrow portions. The sequentially repeating wide portions and narrow portions provide a number of visible light reflecting surfaces positioned at various orientations with respect to a top surface of the protective film such that substantially all visible wavelengths of light incident the top surface diffusely reflect from the visible light reflecting surfaces and exit the top surface.

According to an additional embodiment, a method for forming micro-cracks within a porous structure of an anodized film such that the anodized film appears white is described. The method includes forming a pattern of melted portions within the porous structure by scanning a pulsed laser beam over a top surface of the anodized film. The method also includes forming a pattern of crystallized metal oxide portions within the anodized film by allowing the pattern of melted portions to cool and transform into crystalline form. During the cooling, a number of micro-cracks form within the pattern of crystallized metal oxide portions. The micro-cracks diffusely reflect nearly all visible wavelengths of light incident the crystallized metal oxide portions.

According to a further embodiment, a metal part having an anodized film with a white appearance disposed over an underlying surface of the metal part is described. The anodized film includes a porous metal oxide structure. The anodized film also includes a pattern of crystallized metal oxide portions within the porous metal oxide structure, the pattern of crystallized metal oxide portions having a number of micro-cracks. The micro-cracks have a plurality of visible light reflecting surfaces arranged in varied orientation with respect to an exposed surface of the anodized film. The visible light reflecting surfaces diffusely reflect visible light incident the crystallized metal oxide portions, contributing an opaque and white appearance to the metal part.

According to another embodiment, a method for forming an anodized film on a substrate is described. The method includes sputtering a layer of aluminum onto a substrate, the sputtered aluminum layer having a surface with a first roughness. The method also includes converting a first portion of the sputtered aluminum layer to an anodized film. An underlying second portion of the sputtered aluminum layer has a second surface that has a second roughness associated with the first roughness. The second surface is sufficiently rough such that white light incident to an exposed surface of the anodized layer travels through the anodized layer, diffusely reflects off the second surface, and exits the anodized layer.

According to an additional embodiment, a method for producing an anodized film that appears white is described. The method involves creating a number of openings within the anodized film. The openings having an average size and shape suitable for accommodating a number of light reflective particles. The light reflective particles have a white appearance due to the presence of multiple visible light diffusing surfaces on the light reflective particles. The method also involves infusing the light reflective particles within at least a portion of the openings. The white appearance of the light reflective particles imparts a white appearance to the anodized film.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 4A and 4B show graphs indicating current density as a function of time during two different varied current density anodizing processes.

FIGS. 9A-9C illustrate different laser scan samples with varying spot density, laser power and spot size settings.

DETAILED DESCRIPTION

Representative applications of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to various embodiments of methods and apparatus for anodizing an aluminum surface in such a way that the resulting anodized film appears white. The white appearing anodized films are well suited for providing both protective and attractive surfaces to visible portions of consumer products. For example, methods described herein can be used for providing protective and cosmetically appealing exterior portions of metal enclosures and casings for electronic devices, such as those manufactured by Apple Inc., based in Cupertino, Calif.

Figures 1A, 1B:
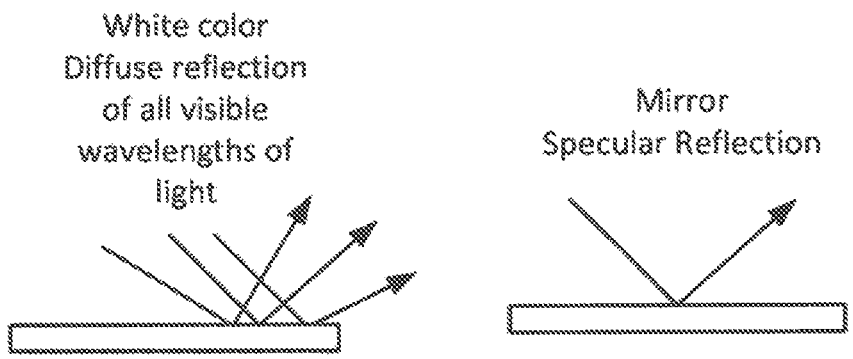
FIGS. 1A-1D illustrate various reflection mechanisms for providing a perceived color or quality of an object.
Figures 1C, 1D:
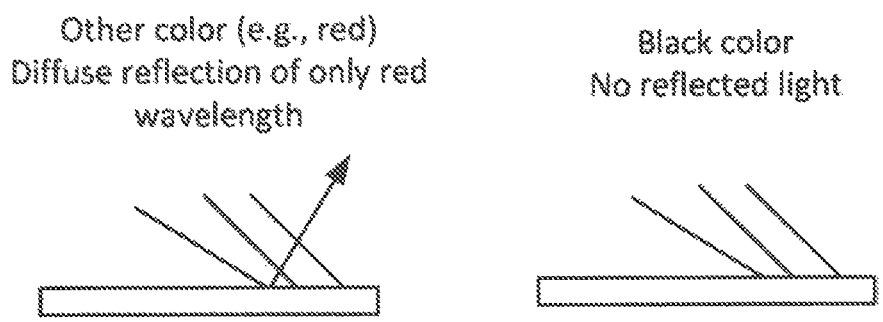

In general, white is the color of objects that diffusely reflect nearly all visible wavelengths of light. Thus, an anodized film can be perceived as white when nearly all visible wavelengths of light incident a top surface of the anodized film are diffusely reflected. FIG. 1A, shows how incident light can be diffusely reflected off a surface and scattered in many directions. Diffuse reflection can be caused by incident light reflecting off of multi-faceted surfaces at a top surface or within an object. For example, facets of ice crystals that form a snowflake diffusely reflect incident light, rendering the snowflake white in appearance. This is in contrast to specular reflection (FIG. 1B) where light is reflected in one direction, colored matte appearing objects (FIG. 1C) where some wavelengths of light are absorbed and only certain wavelengths of light are diffusely reflected, and black objects (FIG. 1D) where substantially all the wavelengths of light are absorbed and no light is reflected.

In the described embodiments, techniques involve forming white appearing anodized films. In some embodiments, the anodized film appears white due to a combination of specular and diffuse reflection of all wavelengths present in white light due to structural features within the anodized film. In some embodiments, the anodized film appears white due to the presence of embedded particles that essentially "dye" the anodized film white. In some embodiments, the anodized film appears white due to the presence of an underlying light diffusing and reflecting layer. In some cases, two or more described techniques for producing white appearing anodized films can be combined.

The amount of perceived whiteness of an anodized film can be measured using any of a number of color analysis techniques. For example a color opponent color space, such as L,a,b (Lab) color space (L indicates the amount of lightness, and a and b indicate color-opponent dimensions) can be used to as a standard from which an objective determination of the perceived whiteness of different anodized film samples can be made. In some embodiments described herein, optimum white anodized films have an L value ranging from about 85 to 100 and a,b values of nearly 0. Therefore, these anodized films are bright and color-neutral.

As used herein, the terms anodized film, anodized layer, anodization film, anodization layer, oxide layer, and oxide film may be used interchangeably and can refer to any appropriate metal oxide film. The anodized films are formed on metal surfaces of a metal substrate. The metal substrate can include any of a number of suitable metals. In some embodiments, the metal substrate includes pure aluminum or aluminum alloy. In some embodiments, suitable aluminum alloys include 1000, 2000, 5000, 6000, and 7000 series aluminum alloys.

Modifying Pore Walls

Figure 2:
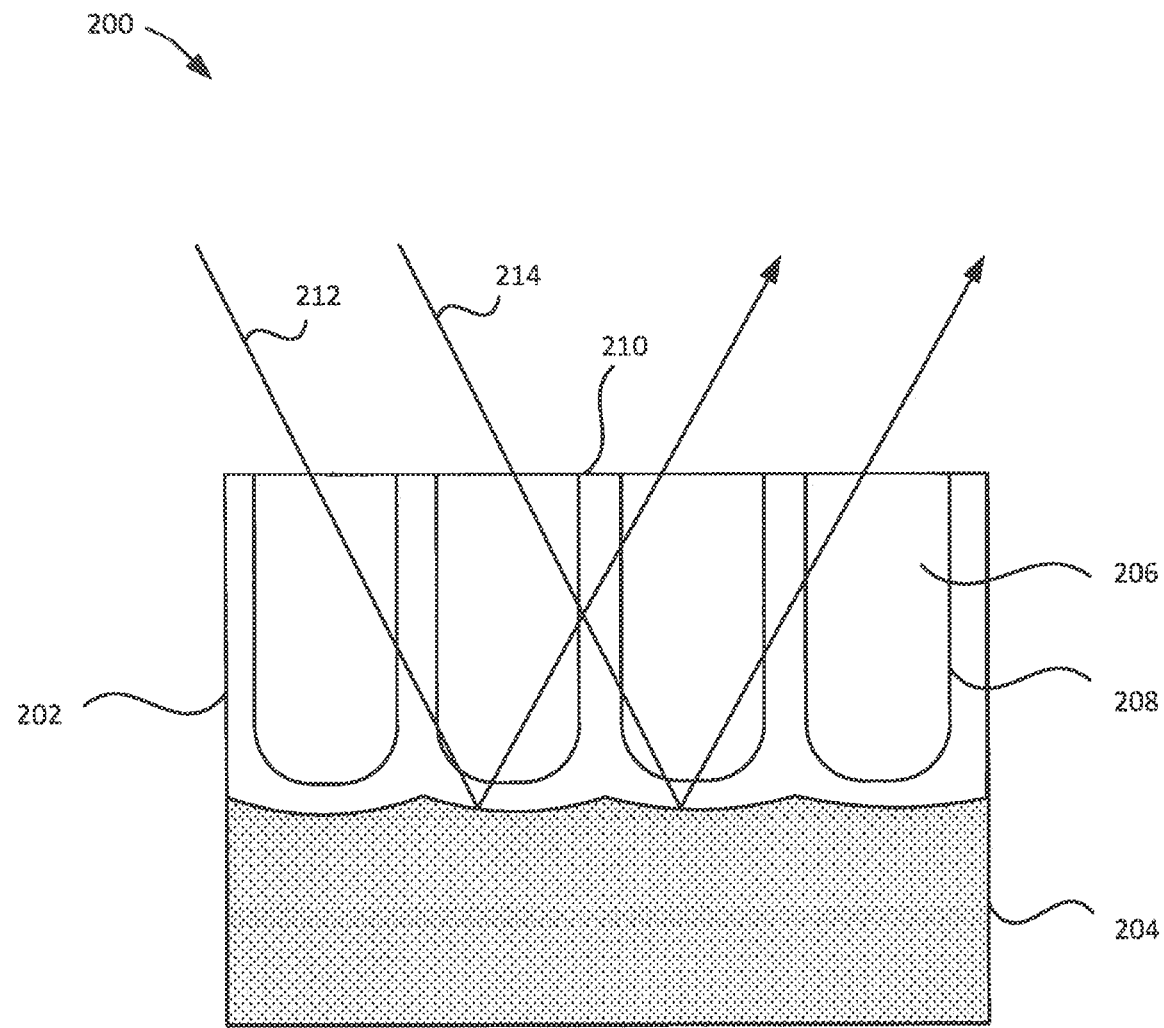
FIG. 2 illustrates a cross section view of a part with an anodized film formed using standard anodizing conditions.

One method for forming a white appearing anodized film involves forming irregular pore walls during the anodizing process. FIG. 2 illustrates a cross section view of part 200 with anodized film 202 formed using standard anodizing conditions. During a standard anodizing process, a top portion of metal substrate 204 is converted to a layer of metal oxide, or anodized film 202, forming multiple self-organizing pores 206 within anodized film 202. Pores 206 are elongated nanometer scale voids that are open at top surface 210 and that are defined by pore walls 208. As shown, pores 206 are highly ordered in that they are each arranged in perpendicular orientation with respect to top surface 210, and are equidistant and in parallel orientation with respect to each other.

Anodized film 202 is generally translucent in appearance since much of the incident white light coming in from top surface 210 can transmit through anodized film 202 and reflect off of at top surface of underlying substrate 204. For example, light ray 212 can enter from top surface 210, pass through anodized film 202, reflect off of a surface of underlying substrate 204, pass again through anodized film 202, and exit at top surface 210. Since pore walls 208 are generally smooth and uniform, they do not substantially interfere with the transmission of light ray 212 through anodized film 202. Thus, as viewed by an observer from top surface 210, anodized film 202 appears translucent and a viewer would see underlying substrate 204. Since substrate 204 would reflect light of a particular wavelength or range of wavelengths, part 200 would appear to have a color close to the color of underlying substrate 204. If underlying substrate 204 is smooth and reflective, the incident light can specularly reflect off underlying substrate 204 (as in a mirror in which an angle of incidence is equal to an angle of reflection). For example, light ray 214 can specularly reflect off underlying substrate 204 in the same direction as light ray 212, giving part 200 a shiny reflective look. It should be noted that anodized film 202 is generally translucent, and not completely transparent, since smaller amounts of incident light will not completely pass through anodized film 202 to underlying substrate 204.

Figure 3:
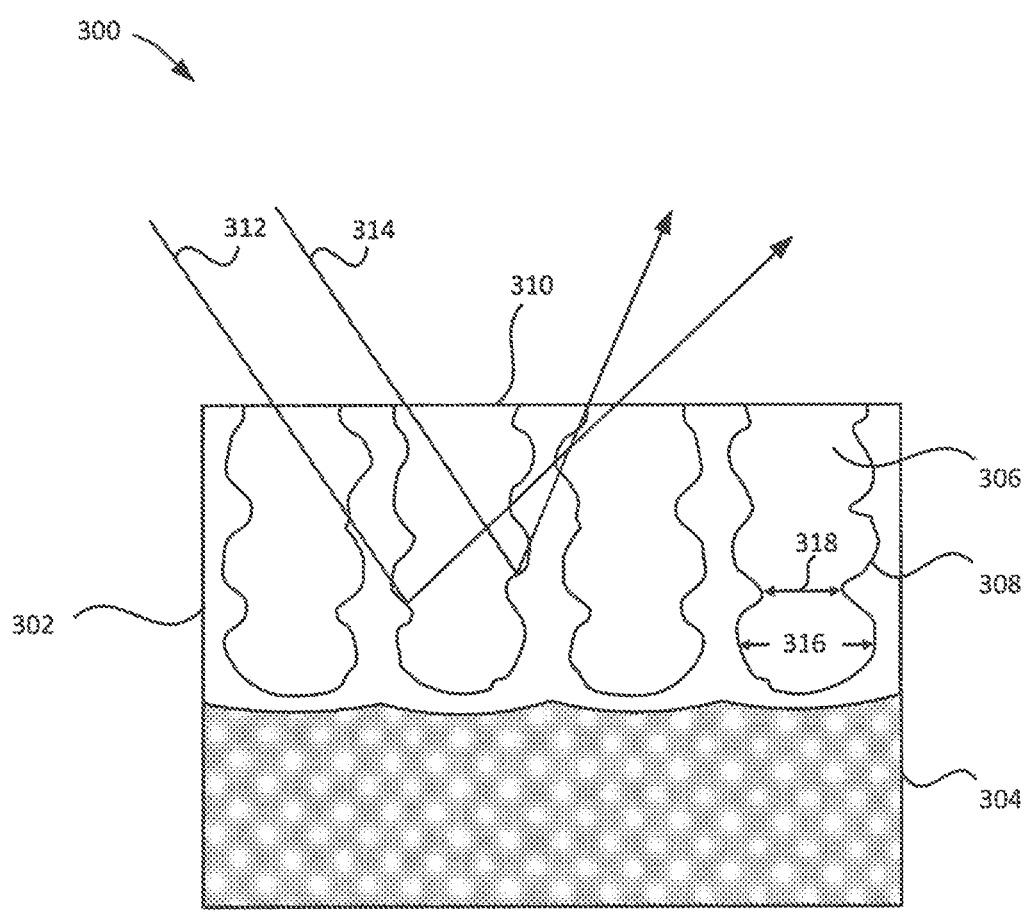
FIG. 3 illustrates a cross section view of a part with a white anodized film formed using varied current densities.

Methods described herein can be used to form an anodized film that has an opaque and white appearance as viewed from a top surface. FIG. 3 illustrates a cross section view of part 300 with anodized film 302 formed using anodizing techniques in accordance with described embodiments. During the anodizing process, a top portion of metal substrate 304 is converted to a layer of metal oxide, or anodized film 302. As shown, pores 306 have pore walls 308 that are irregular in shape. Irregular pore walls 308 have multiple tiny surfaces that can act as reflection points for incident light. For example, light ray 312 can enter from top surface 310, pass through a portion of anodized film 302, reflect off of a first surface of irregular pore walls 308, pass through another portion of anodized film 302, and exit at top surface 310. Similarly, light ray 314 can enter from top surface 310, pass through a portion of anodized film 302, reflect off of a second surface of irregular pore walls 308, pass through another portion of anodized film 302, and exit at top surface 310. Since light rays 312 and 314 do not reach substrate 304, anodized film 302 is not transparent, i.e., opaque. That is, a viewer observing from top surface 310 would not be able to see underlying substrate 304.

In addition to being opaque, anodized film 302 also has a white appearance. As described above, objects appear white when they diffusely reflect, or scatter, nearly all visible wavelengths of light. The multiple surfaces of irregular pore walls 308 arranged in varied angles can scatter incident visible light at multiple different angles. For example, light ray 312 reflecting off the first surface of pore walls 308 exits at top surface 310 at a first angle, while light ray 314 coming in at the same angle as light ray 312 reflects off the second surface of pore walls 308 exits at top surface 310 at a second angle different from the first angle. Since irregular pore walls 308 have many surfaces arranged in many different angles relative to top surface 310 and each other, different light rays entering anodized film 302 at the same angle will exit anodized film 302 at many different angles. In this way, incident visible light can be diffusely reflected and impart a white appearance to anodized film 302.

Techniques for forming a white anodized film with irregular pore walls, such as anodized film 302, include performing an anodizing process while applying a pulsed current density. In general, the current density can affect the width of the pores, with higher current densities generally forming wider pores and lower current densities generally forming narrower pores. By varying the current density during pore growth, the pores are wide in some portions and narrow in other portions. For example, pores 306 can have wide portions having a first diameter 316 formed during high current density conditions and narrow portions having a second diameter 318 formed during low current density conditions, thereby forming irregular pore walls 308.

FIG. 4A shows graph 400 indicating current density (e.g., $A/dm^2$) as a function of time (e.g., minutes) during an anodizing process with varied current density, in accordance with some embodiments. During the anodizing process, a substrate is placed in an anodizing solution and acts as anode when a voltage is applied. As the anodization process converts part of the substrate to a metal oxide, the voltage is increased to a high current density B and decreased to a low current density A at different intervals. As shown, during time interval a, the current density is ramped up from 0 to high current density B. The current density is maintained at high current density B for time interval b. During time interval b, the widths of the pores forming within the anodized film are relatively wide. During time interval c, the current density is decreased to low current density A. The current density is maintained at low current density A for time interval d. During time interval d, the pores continue to form but have narrower widths relative to pore formation during time interval b. In some embodiments, time intervals a, b, c and d are on the order of minutes. The current density is then pulsed, i.e., increased to high current density B and decreased to low current density A, for a series of times until the anodized film reaches a target thickness and the anodizing process is complete. In this way, the widths of the pores can vary as they are being formed, creating irregular pore walls, such as pore walls 308 of FIG. 3.

FIG. 4B shows graph 420 similar to graph 400 of FIG. 4A, but with non-linear increases and decreases in the current density. For example, during time interval a, the current density is ramped up from 0 to high current density B in a non-linear fashion. Likewise, during time interval c, the current density is decreased to low current density A in a non-linear fashion. The manner in which the current density is increased and decreased can affect the shape of the pore walls in the resultant anodized film.

Figure 5:
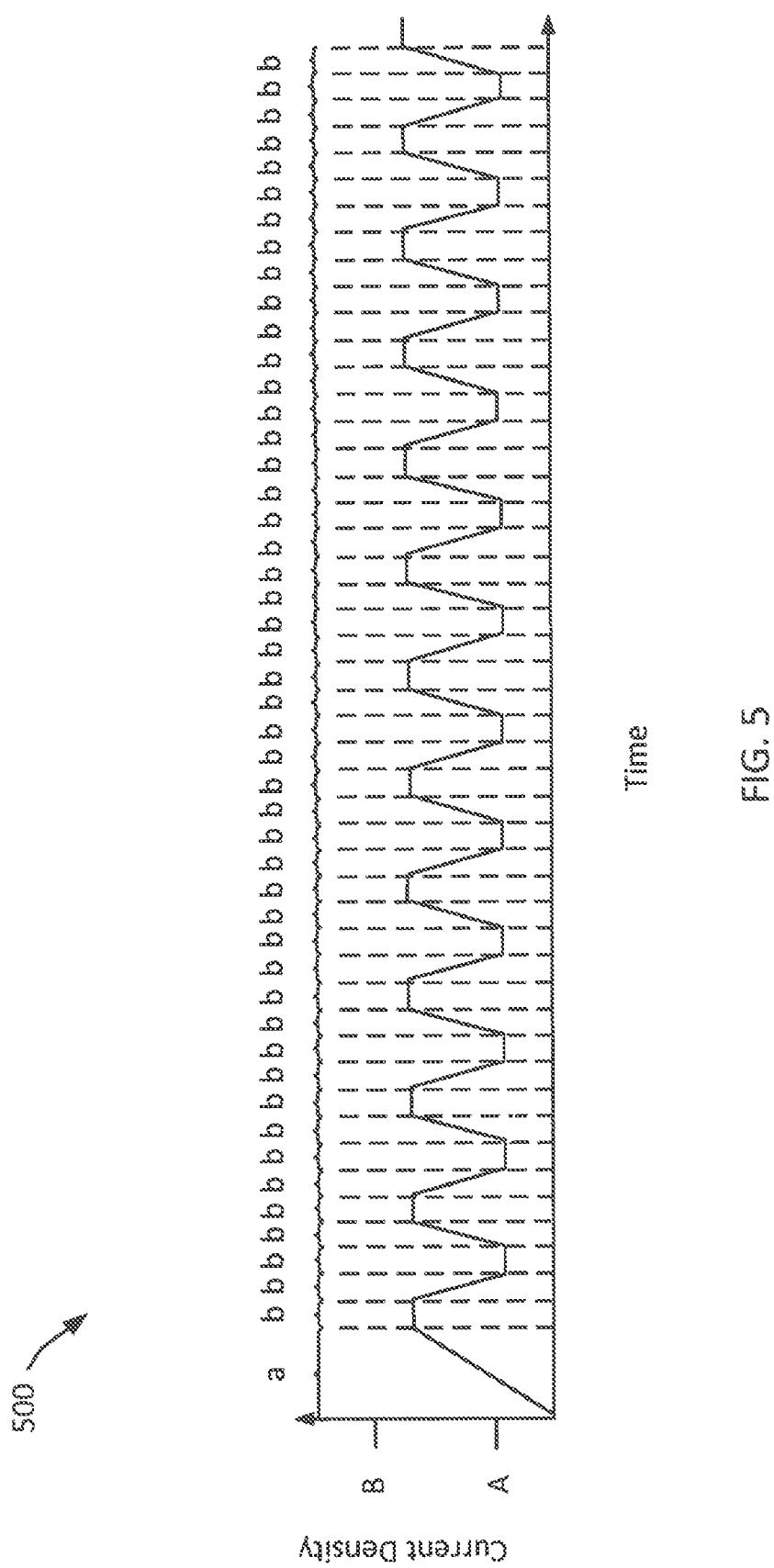
FIG. 5 shows a graph indicating current density as a function of time during another varied current density anodizing process.

The relative time periods of intervals a, b, c, and d presented in graphs 400 and 420 are merely illustrative of particular embodiments and do not necessarily dictate the relative time periods of other embodiments. For instance, time intervals b can be shorter relative to a, c, and d, thereby applying very short pulses of high current density. In other embodiments, one or more time intervals a, b, c, and d are the same. FIG. 5 shows graph 500 indicating current density (e.g., A/dm$^2$) as a function of time (e.g., minutes) during an anodizing process with evenly spaced short pulses of high current density, in accordance with additional embodiments. As shown, during time interval a, the current density is ramped up from 0 to high current density B. The current density is maintained at high current density B for time interval b. During time interval b, the widths of the pores forming within the anodized film are relatively wide. During another time interval b, the current density is decreased to low current density A. The current density is maintained at low current density A for an additional time interval b, during which time the pores continue to form but have narrower widths relative to pore formation during high current density B. In some embodiments, time interval b is on the order of minutes. In other embodiments, time interval b is on the order of seconds. The current density is then pulsed, i.e., increased to high current density B and decreased to low current density A, for a series of times until the anodized film reaches a target thickness and the anodizing process is complete. In some embodiments, the anodizing process can involve applying a series of very short pulses of high current density followed by a series of longer pulsed of high current density. These different parameters can affect the shape and irregularity of the pore walls in different ways, producing slight variations of whiteness of the resulting anodized film.

The low and high current density values described above with reference to FIGS. 4A, 4B, and 5 can vary depending upon the desired pore wall shape and on particular application requirements. In some embodiments, high current density B ranges between about 2.0 and 4.0 A/dm$^2$ and low current density A ranges between about 0.5 and 2.0 A/dm$^2$. Since the applied current density is related to voltage, the process can also be varied with respect to high and low voltage values. The target thickness of the anodized film can also vary depending, in part, on particular application requirements. In some embodiments, the anodizing process is performed until a target thickness of about 20 to 35 microns is achieved.

In addition to controlling the shape and irregularity of the pore walls, the pores density can be controlled during the anodizing process by adjusting the anodizing bath temperature. In general, the higher the bath temperature, the thinner the metal oxide material is formed between the pores and the higher the pore density. The lower the bath temperature, the thicker the metal oxide material is formed between the pores and the lower the pore density. Higher pore density is directly associated with the amount of pore walls that can act as reflective surface for incident light. Therefore, the higher the pore density, the higher the amount of irregularly shaped pore walls and the more light scattering medium provided for diffusing incident light. As such, higher bath temperatures generally produce whiter anodized film than lower bath temperatures. However, other factors, such as durability of the anodized film, should also be considered when choosing the bath temperature. In some embodiments, an anodizing bath temperature of about 0° C. to about 25° C. is used.

Figure 6:
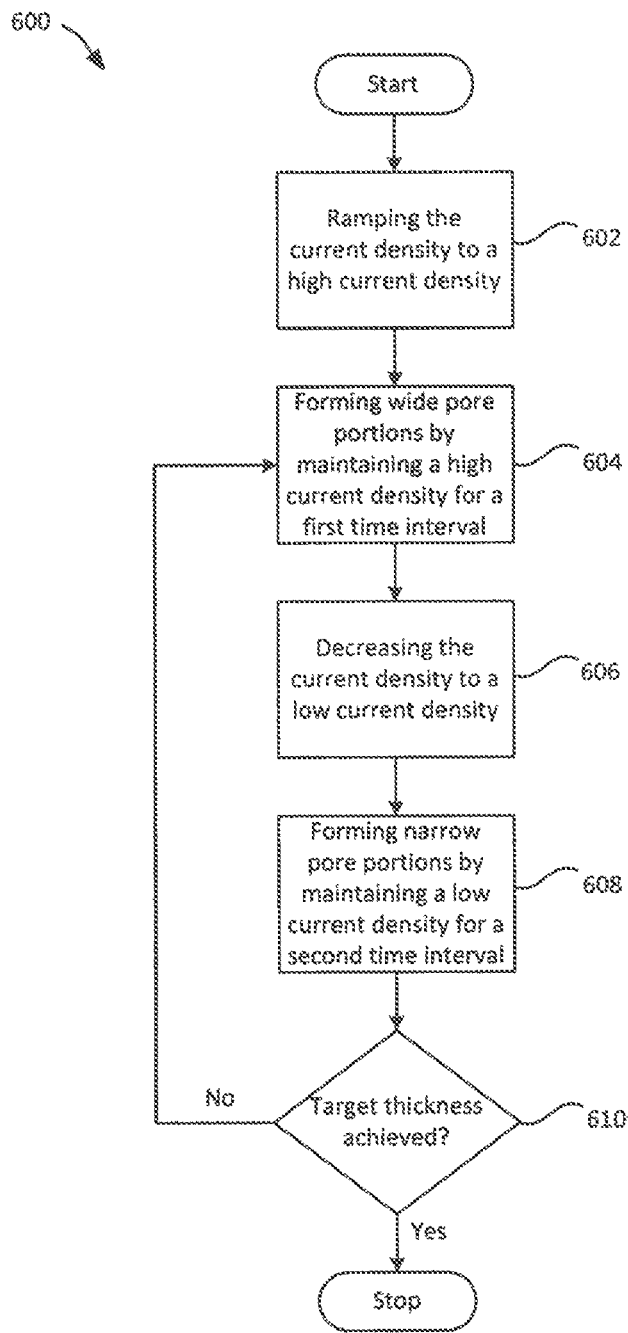
FIG. 6 shows a flowchart indicating steps for forming a white anodized film having irregular or textured pore walls using a varied current density anodizing process.

FIG. 6 shows flowchart 600 indicating steps for forming a white anodized film having irregular or textured pore walls using a varied current density anodizing process, in accordance with some embodiments. At 602, the current density during an anodizing process is ramped up to a high current density, such as high current density B of FIGS. 4 and 5. At 604, the current density is maintained at the high current density for a first time interval. During the first time interval, wide portions of the pores are formed. At 606, the current density is decreased to a low current density, such as low current density A of FIGS. 4 and 5. At 608, the current density is maintained at the low current density for a second time interval. During the second time interval, narrow portions of the pores are formed. Note that in some embodiments, the current density is first ramped to the low current density, followed by increasing to the higher current density. At 610, it is determined whether the target thickness of the anodized film is achieved. If the target thickness is achieved, the anodizing process is complete. If the target thickness has not yet been achieved, processes 604, 606, 608, and 610 are repeated until the target thickness is achieved. In some embodiments, the target thickness is between about 5 and 50 microns. In some embodiments, the target thickness is achieved at between about 20 and 90 minutes. The resultant anodized film has pores with irregular pore walls that can diffusely reflect incident light, thereby imparting a white and opaque appearance to the anodized film.

Note that before and after the anodizing process of flowchart 600, one or more of any suitable pre and post anodizing processes can be implemented. For example, prior to anodizing, the substrate can undergo one or more cleaning, polishing and blasting operations. In addition, after anodizing, the anodized film can be colored using a dye or electrochemical coloring process. In some embodiments, the surface of the anodized film is polished using mechanical methods such as buffing or lapping.

Forming Micro-Cracks within an Anodized Film

Figures 7A, 7B:
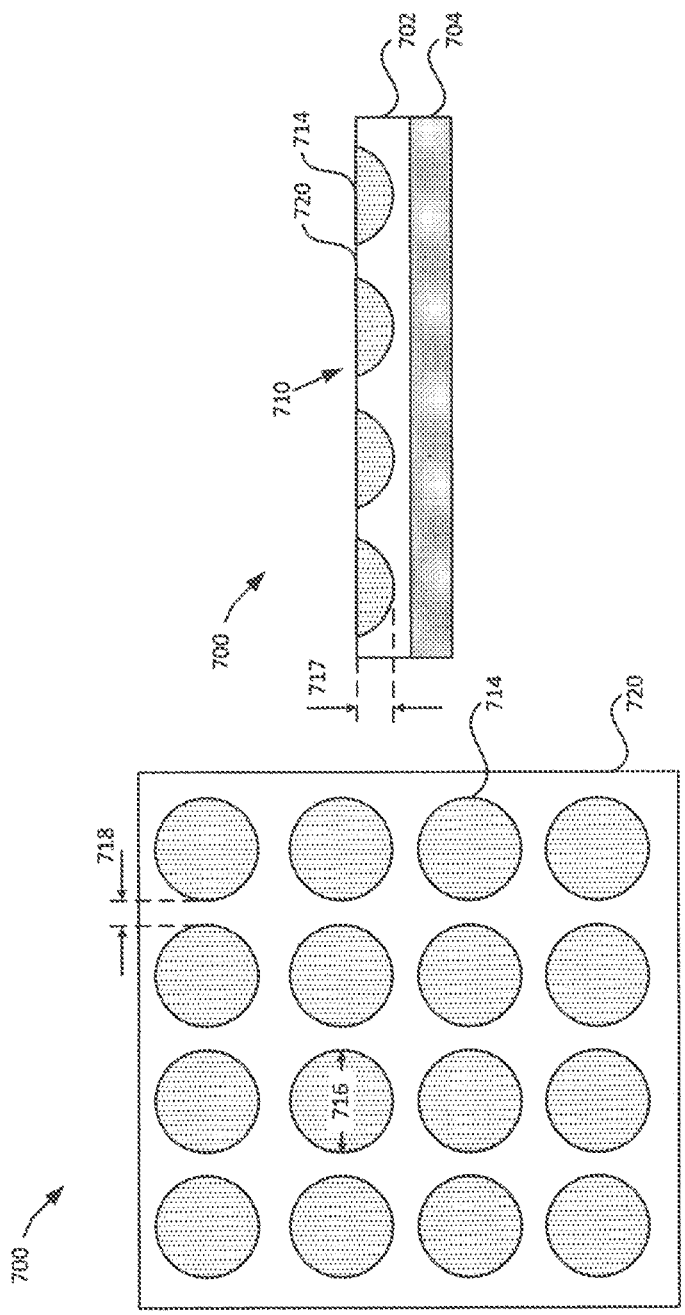
FIGS. 7A-7C illustrate top and cross section views of a part having a white anodized film after undergoing a laser cracking procedure.

Another method for forming a white anodized film involves forming localized micro-cracks at the surface portions or sub-surface portions of the anodized film. The cracks can be formed by raster scanning a pulsed laser beam over a surface of the anodized film. FIGS. 7A and 7B illustrate a top view and a cross section view, respectively, of part 700 after undergoing a laser cracking procedure, in accordance with described embodiments. Part 700 includes anodized film 702 formed over underlying substrate 704. During the laser cracking procedure, a pulsed laser beam is raster scanned over top surface 710 of anodized film 702. The raster scanning produces a pattern of spot areas 714, which represent areas of anodized film 702 that have been exposed to a pulse of a laser beam during the raster scanning. As shown, spot areas 714 are arranged in a pattern surrounded by unexposed areas 720. The size of each spot area 714 can be measured in terms of spot diameter 716 and can be controlled by laser settings. Spacing 718 between spot areas 714 can be controlled by controlling the raster settings of the laser apparatus. The raster scan pattern shown in FIGS. 7A and 7B are solely shown as an example. In other embodiments, other raster scan patterns having different spacings 718 can be used. As shown, spot areas 714 penetrate a distance 717 within anodized film 702. Distance 717, in part, depends on the wavelength of the laser beam. The laser beam should be a wavelength that is tuned to interact with anodized film 702 without substantial interaction with underlying substrate 704. In some embodiments, a $CO_2$ laser is used, which produces infrared light having principle wavelength bands centering around 9.4 and 10.6 micrometers.

Figure 7C:
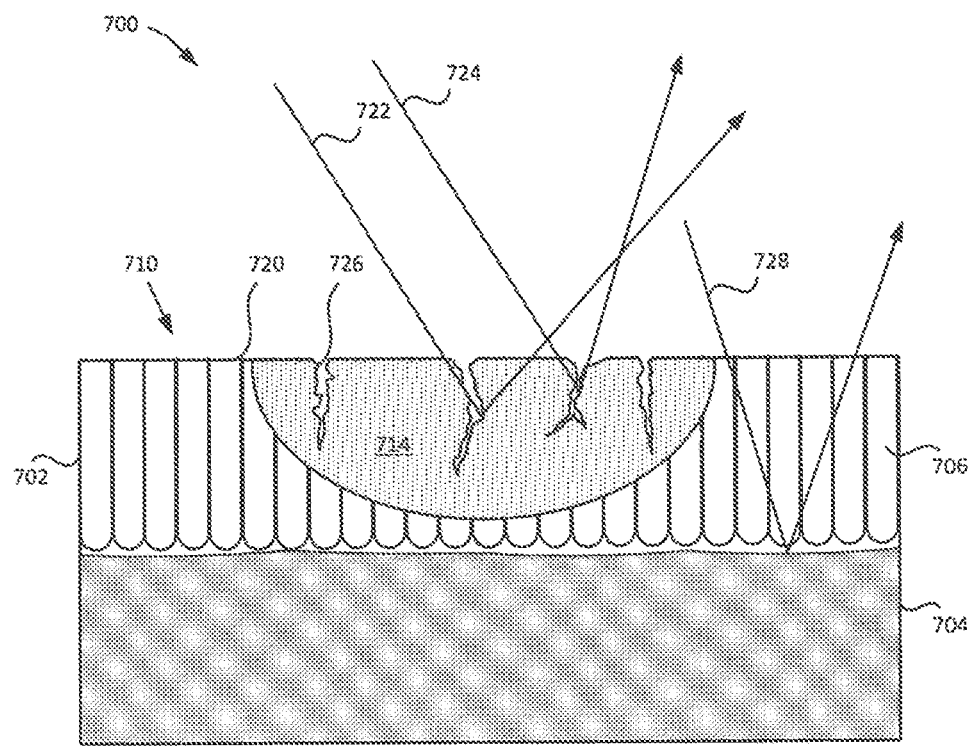

Spot areas 714, which have been exposed to laser beam pulses, include micro-cracks that can diffusely reflect incident light. To illustrate, FIG. 7C illustrates a close-up cross section view of part 700 showing a region around a single spot area 714. As shown, areas 720 unexposed to the laser beam have standard highly ordered pores 706 as part of a porous metal oxide structure. In contrast, the porous structure within spot area 714 has been modified in the form of cracks 726. Cracks 726 are formed when energy from the incident laser beam generates enough localized heat that all or some portions of metal oxide material within spot area 714 melt. That is, the heat is sufficient to at least reach the glass transition temperature of the metal oxide material. When the heat dissipates and the metal oxide material cools, the metal oxide material transforms from an amorphous glass-like material to a crystalline form. In this way, the porous structure of the anodized film 702 is transformed to a crystalline metal oxide form in spot areas 714. In addition, as the metal oxide cools, it contracts and causes cracks 726 to form within spot area 714. In some embodiments, cracks 714 are on the scale of between about 0.5 and 30 microns in length. Cracks 714 have irregular interfaces that cause incident light to scatter. For example, light ray 722 reflects off of a first surface of cracks 726 at a first angle, while light ray 724 coming in at the same angle as light ray 722 reflects off a second surface of cracks 726 at a second angle different from the first angle. Since cracks 726 have many surfaces arranged at many different angles relative to top surface 710, different light rays will reflect off cracks 726 at many different angles. In this way, incident visible light can be diffusely reflected off spot areas 714 and impart a white appearance to anodized film 702.

Figure 8:
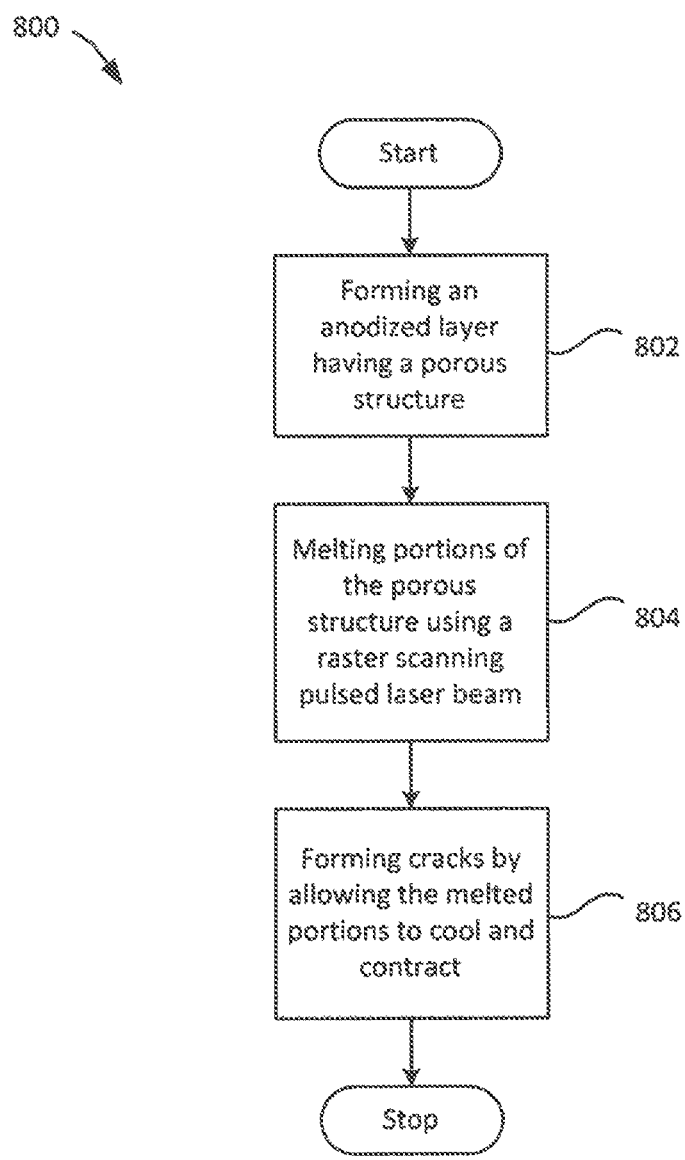
FIG. 8 shows a flowchart indicating steps for forming a white anodized film having micro-cracks using a raster scanning pulsed laser beam.

FIG. 8 shows flowchart 800 indicating steps for forming a white anodized film having micro-cracks using a raster scanning pulsed laser beam, in accordance with some embodiments. At 802, an anodized film having a porous structure is formed on a substrate. As described above, a standard anodized film having a highly ordered porous structure can be used. At 804, portions of the porous structure are melted using a raster scanning pulsed laser beam. The portions of the porous structure can be arranged in a raster pattern, such as shown in FIGS. 7A-7C, with each spot area corresponding to a pulse of the laser beam. The laser beam should be tuned such that the energy beam is focused on the anodized film and not on the underlying substrate. At 806, the melted portions of the porous structure are allowed to cool and contract, thereby forming micro-cracks within the porous structure. During the cooling process all or some of the melted portions can reform into crystalline metal oxide form. The resultant anodized film has micro-cracks that can diffusely reflect incident light, thereby imparting a white and opaque appearance to the anodized film.

In some embodiments, a combination of diffuse and specular reflection can be cosmetically beneficial. As described above, specular reflection is when incident light is reflected in substantially one direction, imparting a mirror-like and shiny quality to an object. Specular reflection occurs when incident light reflects off of smooth surfaces such as glass or calm bodies of water. Specular reflection can also make an object appear bright since the light is directly reflected off the smooth surface. Thus, an anodized film that diffusely reflects light, as well as specularly reflects light, can have a white and bright quality. Returning to FIG. 7C, incident light can specularly reflect off underlying substrate 704 of unexposed areas 720 if the surface of the underlying substrate is smooth. For example, light ray 728 specularly reflects off of underlying substrate 704 of unexposed area 720. Thus, the relative amount of diffuse and specular reflection of anodized film 702 can be controlled by controlling the relative amount of anodized film 702 exposed to an incident laser beam. The amount of laser beam exposure can be controlled by parameters such as spot density, laser power and spot size.

FIGS. 9A-9C show different laser scan samples illustrating how varying spot density, laser power and spot size can affect the amount of relative diffuse and specular reflection of white anodized films. FIG. 9A shows the effect of varying the spot density, or the raster pattern, of a laser beam. The spot density can be measured as a function of spot diameter D. At sample 902, the distance between the centers of the spots is three times the diameter D of the spots. At sample 904, the distance between the centers of the spots is two times the diameter D of the spots. At sample 906, the distance between the centers of the spots is equal to the diameter D of the spots. At sample 908, the distance between the centers of the spots is half of the diameter D of the spots. The more distance between the spots, the greater specular reflection relative to diffuse reflection. Thus, sample 908 will diffusely reflect more light than sample 902. Sample 908 will have more of a white matte quality and sample 902 will have more of a reflective mirror-like quality.

FIG. 9B shows the effect of varying the laser power of a laser beam, as indicated by spot darkness. The laser power was varied from low laser power at sample 910 and increased to high laser power at sample 916. The higher the laser power, the more diffuse reflectance will occur. Thus, sample 916 will have a more matte quality than sample 910. FIG. 9C shows the effect of varying the spot diameters, or laser beam size, of the incident laser beam. Like the sample of FIG. 9A, samples 918, 920, 922 and 924 each have different spot densities. However, the spot diameters of these samples are 40% smaller than the spot diameters of FIG. 9A. Samples 918, 920, 922 and 924 have different amounts of diffuse versus specular reflective qualities compared to samples 902, 904, 906 and 908.

Figure 9D:
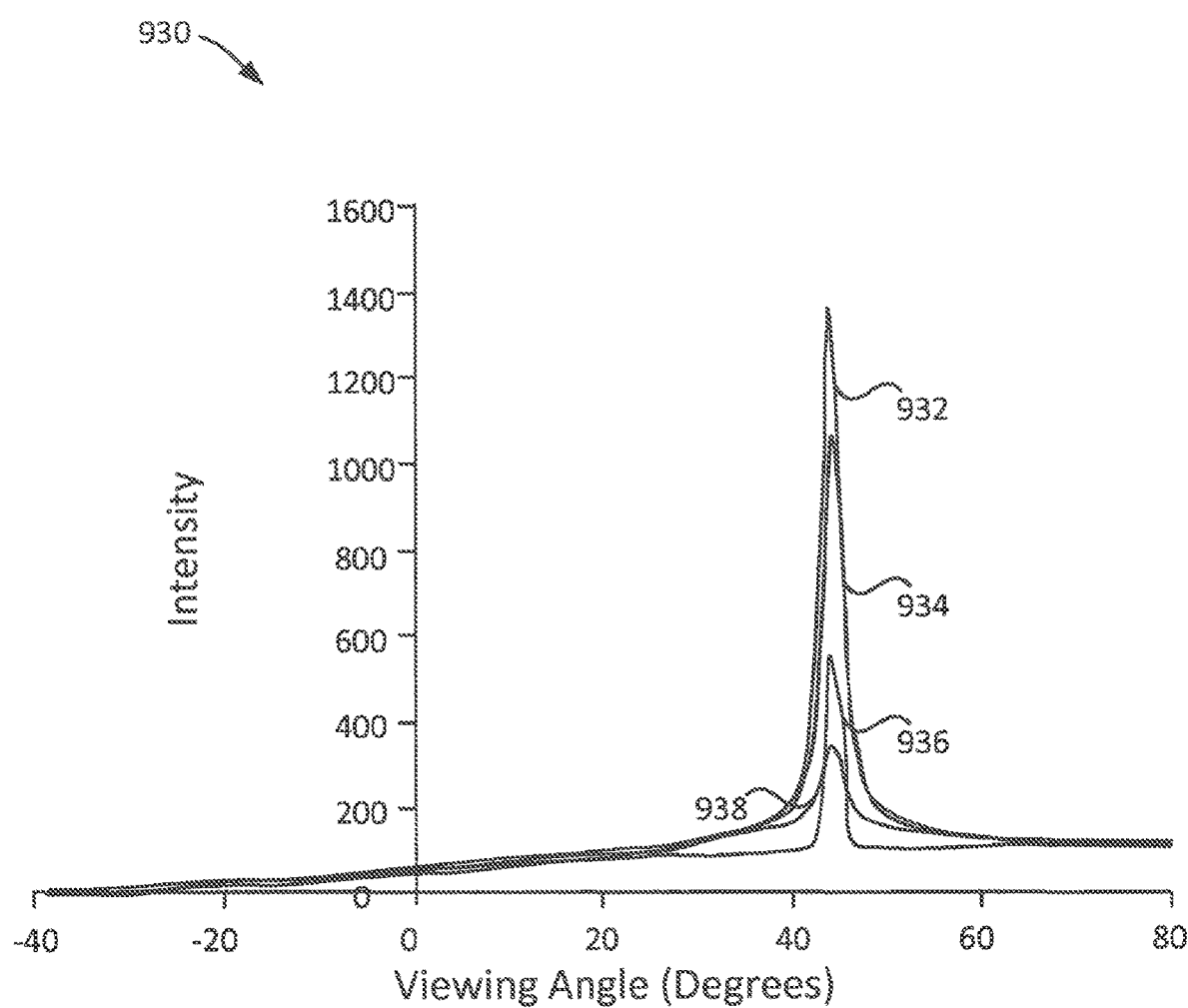
FIG. 9D illustrates a graph showing specular reflected light intensity as a function of viewing angle for different anodized film samples.

The amount of specular reflection of a white anodized film can be measured using any of a number of light reflection measurement techniques. In some embodiments, a spectrometer configured to measure specular light intensity at specified angles can be used. The measure of specular light intensity is associated with an amount of lightness and L value, as described above. FIG. 9D shows graph 930 indicating specular reflected light intensity as a function of viewing angle for four different anodized film samples using a spectrometer. Each sample can have a different spot area pattern, such as each of samples 902-924 of FIGS. 9A-9C. Spectra 932, 934, 936 and 938 are from four different samples of anodized films taken at a 45 degree viewing angle. Spectrum 936 corresponds to a target anodized film sample that has a desired amount of specular reflection for producing a desired white and bright appearance. As shown, spectra 932 and 934 indicate samples that have greater than target amount of specular reflection. Conversely, spectrum 938 indicates a sample that has a lower than target amount of specular reflection. Thus, the spot density, laser power and spot size can be tuned by measuring and comparing the amounts of specular reflection of different samples in order to produce a white anodized film having a desired amount of diffuse and specular reflection.

Figure 10:
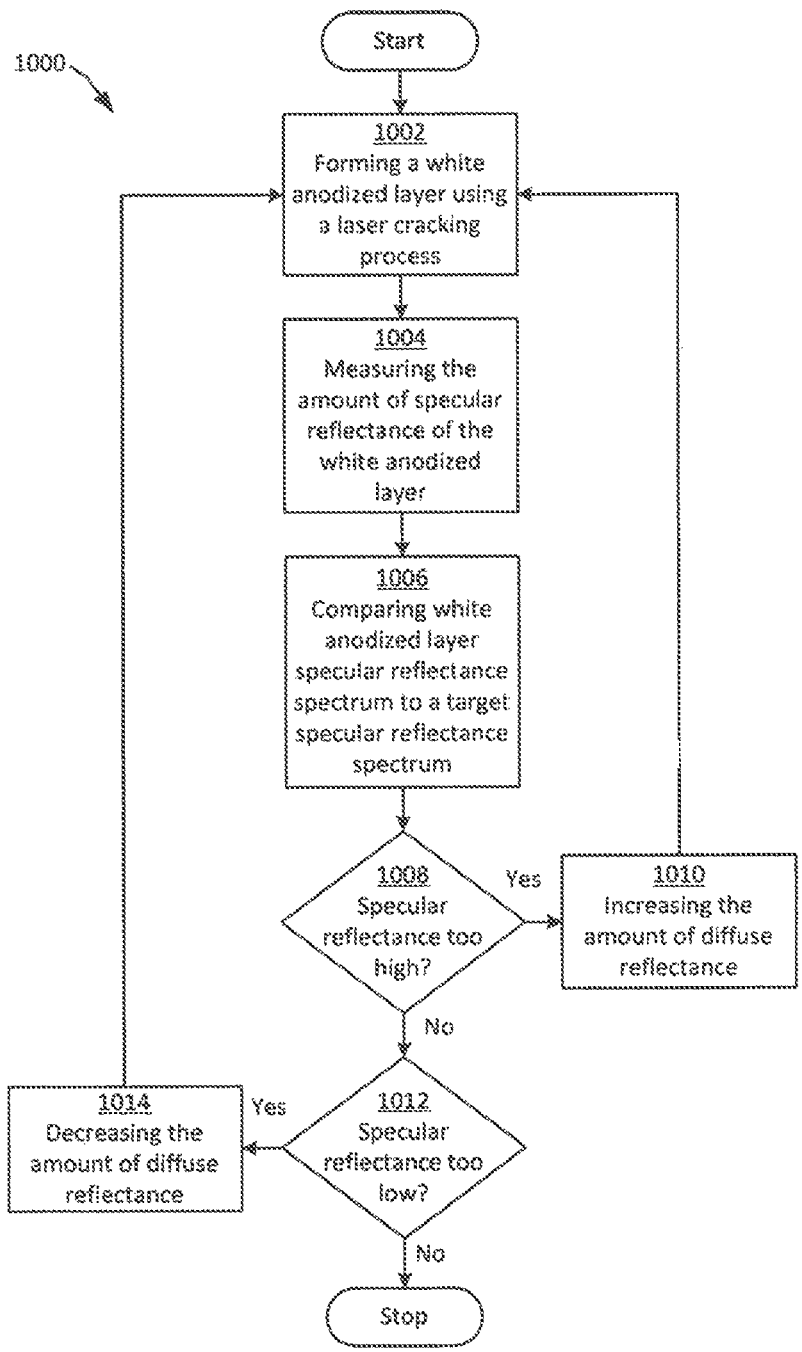
FIG. 10 shows a flowchart indicating steps for tuning a laser cracking process for producing a white anodized film having a target amount of diffuse and specular reflectance.

FIG. 10 shows flowchart 1000 indicating steps for tuning a laser cracking process for producing a white anodized film having a target amount of diffuse and specular reflectance. At 1002, a white anodized film using a laser cracking process is formed. The laser cracking process will have a set of parameters such as spot density, laser power and spot size. At 1004, the amount of specular reflectance of the white anodized film is measured using a spectrometer. As described above, the spectrometer can measure the spectral reflectance at a defined angle and generate a corresponding spectrum. At 1006, the specular reflectance spectrum of the white anodized film is compared to a target specular reflectance spectrum. The target specular reflectance spectrum will correspond to a white anodized film having a desired amount of specular and diffuse reflection.

At 1008, it is determined from the comparison whether the amount of specular reflectance of the white anodized film is too high. If the specular reflectance is too high, at 1010, the relative amount of diffuse reflectance is increased by changing process parameters, such as by increasing the spot density and/or laser power. Then, returning to 1002, an additional white anodized film is formed using a laser cracking process with the new process parameters. If the specular reflectance is not too high, at 1012, it is determined from the comparison whether the amount of specular reflectance of the white anodized film is too low. If the specular reflectance is too low, at 1014, the relative amount of diffuse reflectance is decreased by changing process parameters, such as by decreasing the spot density and/or laser power. Then, returning to 1002, an additional white anodized film is formed using a laser cracking process with the new process parameters. If the specular reflectance is not too low, the white anodized film has a target amount of diffuse and specular reflectance.

Figure 11:
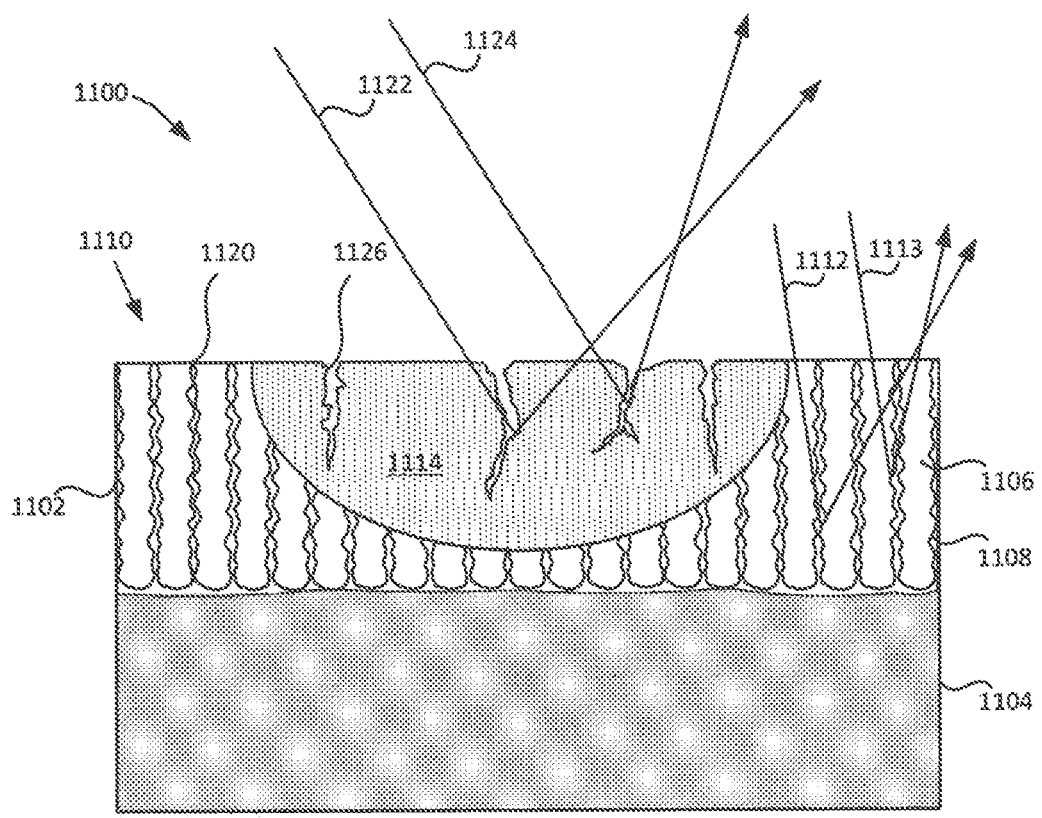
FIG. 11 illustrates a cross section view of a part with a white anodized film formed using a combination of varied current density anodizing and laser cracking procedures.

In some cases, it can be desirable to produce a white anodized film having both light diffusing irregular pores, as described above with reference to FIGS. 3-6, and light diffusing cracks, as described above with reference to FIGS. 7-10. FIG. 11 illustrates a cross section view of part 1100 with anodized film 1102 formed using anodizing techniques in accordance with described embodiments. During an anodizing process, a top portion of metal substrate 1104 is converted to anodized film 1102. Also during the anodizing process, the current density is varied, or pulsed, with a series of low and high current densities. The pulsed current density during pore formation produces pores 1106 having irregular pore walls 1108. Irregular pore walls 1108 have multiple tiny surfaces that are arranged a varied angles relative to top surface 1110 that can act as reflection points for diffusing incident light. For example, light ray 1112 reflects off of a first surface of irregular pore walls 1108 at a first angle, while light ray 1113 reflects off a second surface of irregular pore walls 1108 at a second angle different from the first angle. Since irregular pore walls 1108 have many surfaces arranged at many different angles relative to top surface 1110, different light rays will reflect off irregular pore walls 1108 at many different angles, thereby imparting an opaque and white quality to anodized film 1102.

In addition, after anodized film 1102 having irregular pore walls 1108 is formed, anodized film 1102 has undergone a laser cracking procedure. During the laser cracking procedure, a pulsed laser beam is raster scanned over top surface 1110 of anodized film 1102. Spot area 1114 represents an area of anodized film 1102 that has been exposed to a pulse from a laser beam during the raster scanning. Spot area 1114 has cracks 1126 that can diffusely reflect incident light. For example, light ray 1122 reflects off of a first surface of cracks 1126 at a first angle, while light ray 1124 reflects off a second surface of cracks 1126 at a second angle different from the first angle. Since cracks 1126 have many surfaces arranged at many different angles relative to top surface 1110, different light rays will reflect off cracks 1126 at many different angles. In this way, cracks 1126 of spot areas 1114 contribute a cosmetically appealing white and opaque quality to part 1100.

Figure 12:
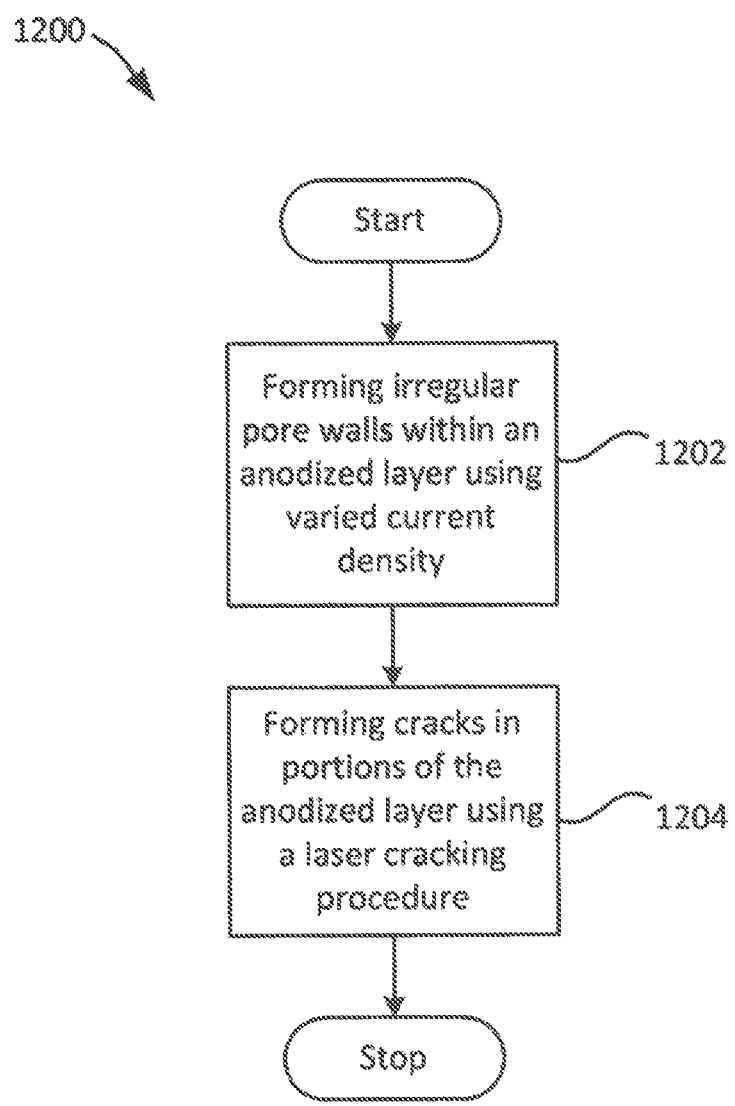
FIG. 12 shows a flowchart indicating steps for forming a white anodized film formed using a combination of varied current density anodizing and laser cracking procedures.

FIG. 12 shows flowchart 1200 indicating steps for forming a white anodized film formed using a combination of varied current density anodizing and laser cracking procedures. At 1202, an anodized film having irregular pore walls is formed by using a varied current anodizing process. Incident visible light will diffusely reflect off the irregular pore walls and contribute an opaque and white quality to anodized film. At 1204, cracks are formed within portions of the anodized film using a laser cracking procedure. Incident visible light will diffusely reflect off the cracks and contribute an opaque and white quality to the anodized film.

Adding an Underlying Light Diffusing Layer

Figure 13A:
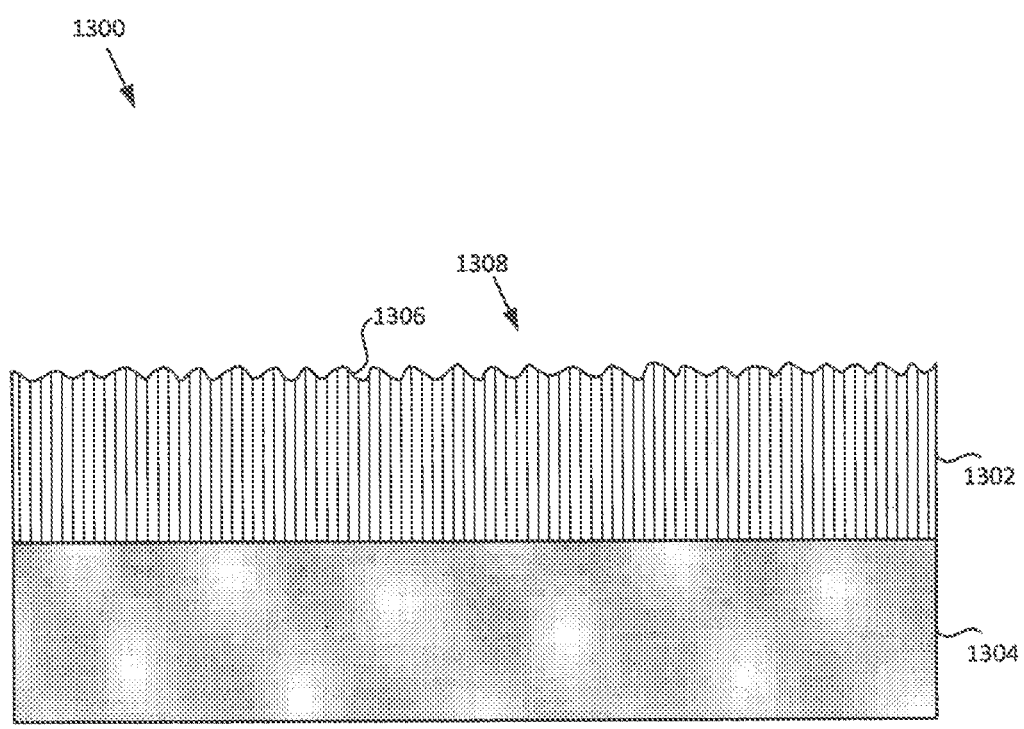
FIGS. 13A-13B illustrate cross section views of a part undergoing a reflective layer depositing process following by an anodizing process.
Figure 13B:
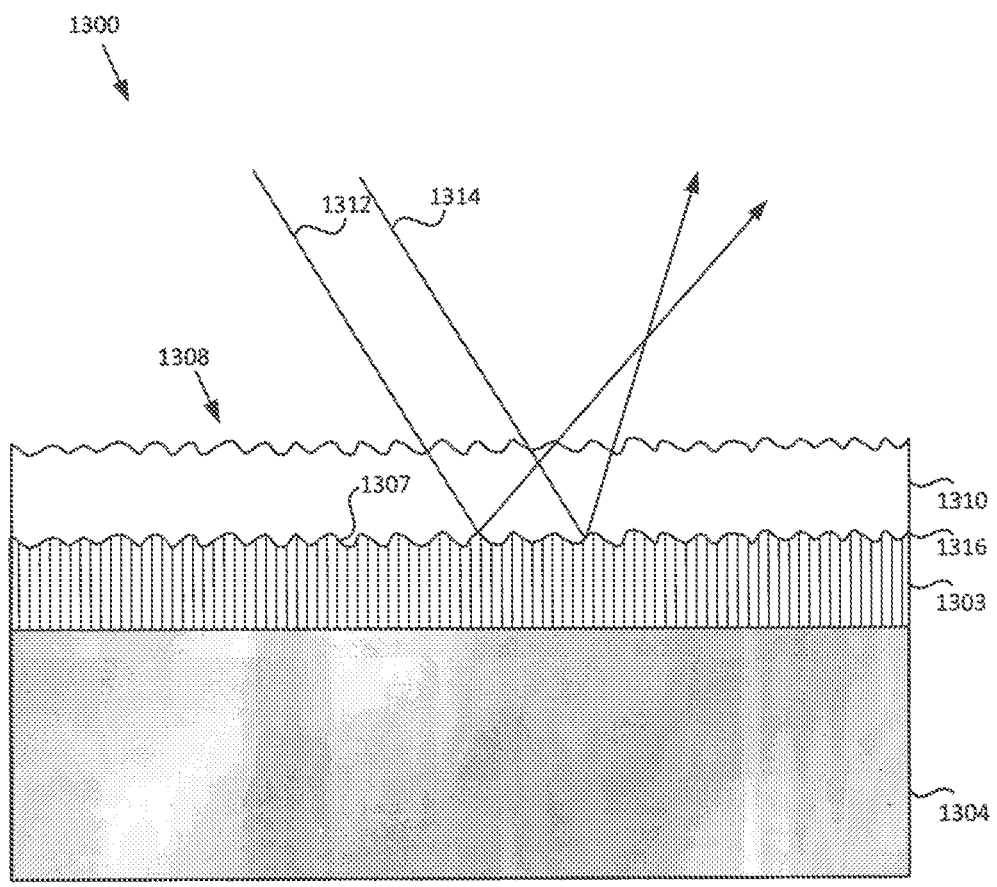

One method for forming a white anodized film involves depositing a layer of white and reflective material below an anodized film such that incident light shining through the anodized layer is diffusely and specularly reflected back through the anodized layer and exits a top surface. FIGS. 13A-13B illustrate cross section views of part 1300 undergoing a reflective layer depositing process and an anodizing process in accordance with described embodiments. At FIG. 13A, aluminum layer 1302 is deposited on metal substrate 1304. Aluminum layer 1302 can be a substantially pure aluminum layer since pure aluminum is generally brighter in color, i.e., spectrally reflective, compared to aluminum alloys. In some embodiments, aluminum layer 1302 can be deposited using a plating process. In other embodiments, aluminum layer 1302 is deposited using a physical vapor deposition (PVD) process. Aluminum layer 1302 has a first rough surface 1306 that diffusely reflects incident visible light. The PVD process can be tuned to provide the right amount of roughness 1306 to create a target amount diffuse reflection. Aluminum layer 1302, as viewed from top surface 1308, can have a silver metallic look of aluminum that has a whitened element from rough surface 1306.

At FIG. 13B, a portion of aluminum layer 1302 is converted to an aluminum oxide layer 1310. As shown, a portion 1303 of aluminum layer 1302 remains beneath aluminum oxide layer 1310. Aluminum portion 1303 has a second rough surface 1307 situated at interface 1316 between aluminum portion 1303 and aluminum oxide layer 1310. Second rough surface 1307 is associated with and has similar dimensions as first rough surface 1306 prior to anodizing. Thus, second rough surface 1307 can also diffusely reflect light. In some embodiments, aluminum oxide layer 1310 is translucent. Therefore, light incident to top surface 1308 of aluminum oxide layer 1310 can travel through aluminum oxide layer 1310 and diffusely reflect off second rough surface 1307, imparting a white appearance to part 1300. For example, light ray 1312 can enter aluminum oxide layer 1310, reflect off a first surface of rough surface 1306, and exit aluminum oxide layer 1310 at a first angle. Light ray 1314 can enter aluminum oxide layer 1310 at the same angle as light ray 1312, reflect off a second surface of rough surface 1306, and exit aluminum oxide layer 1310 at a second angle different from the first angle.

In addition to surface roughness 1306, light diffusing qualities of aluminum layer 1302 can be enhanced by varying the thickness of aluminum layer 1302. Specifically, as the thickness of aluminum layer 1302 is increased from 0 microns to 50 microns, the amount of spectral reflection produced by aluminum layer 1302 decreases and the amount of diffuse reflection increases. It is believed that this is due to the rougher surface produced by the thicker sputtered on aluminum material. In general, the longer the sputtering time, the thicker aluminum layer 1302 becomes. As described above, it can be cosmetically beneficial to have a combination of spectral and diffuse reflection in order to provide a white appearing surface that is also bright. In some embodiments, an aluminum layer 1302 having a thickness of ranging from about 10 and 25 microns produces a combination of diffuse and spectral reflection that is cosmetically white and bright.

Figure 14:
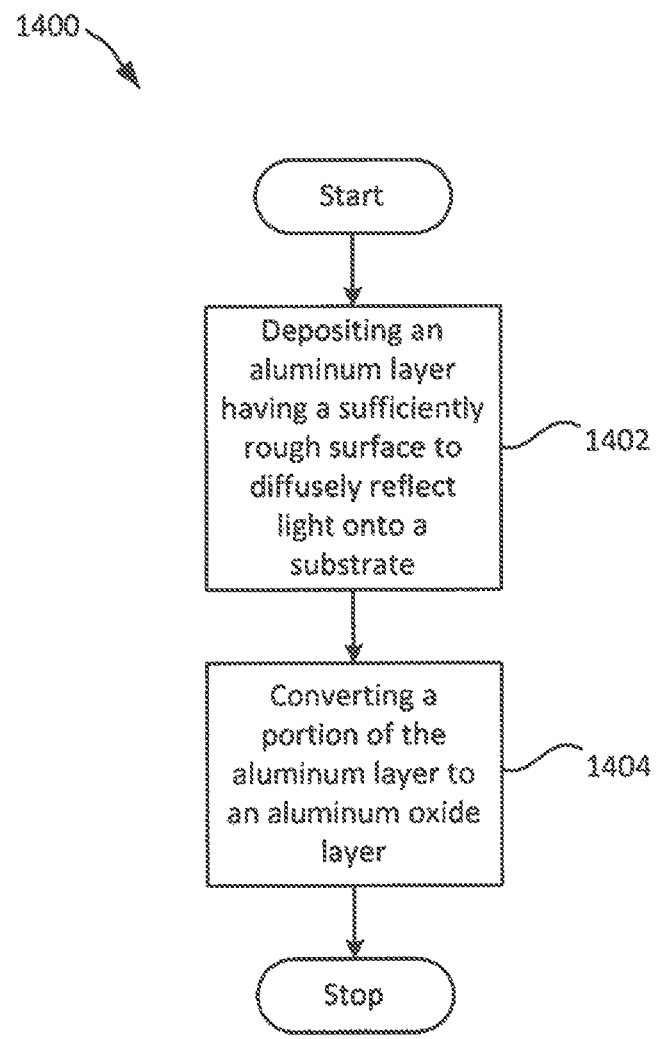
FIG. 14 shows a flow chart indicating steps for forming a white anodized film by depositing an underlying reflective layer.

FIG. 14 shows flow chart 1400 indicating steps for forming a white appearing anodized film on a substrate by depositing an underlying reflective layer. At 1402, an aluminum layer having a sufficiently rough surface to diffusely reflect incident light is deposited on the substrate. In some embodiments, the aluminum layer is substantially pure aluminum. In some embodiments, the aluminum layer is sputtered onto the substrate. The roughness, and therefore the relative amount of diffuse versus spectral reflection, of the surface of the aluminum layer can be tuned by controlling the type of sputtering and thickness of which the aluminum layer is sputtered on. At 1404, a portion of the aluminum layer is converted to an aluminum oxide layer. Since a portion of the aluminum layer is converted, an underlying portion of the aluminum layer remains beneath the aluminum oxide layer. The underlying portion of the aluminum layer as a second rough surface at the interface between the remaining aluminum layer and the aluminum oxide layer. The second rough surface is associated with the first rough surface of the aluminum layer prior to anodizing. White light entering the aluminum oxide layer can travel through the aluminum oxide layer, diffusely reflect off the second rough surface, and exit the aluminum oxide layer, thereby imparting a white appearance to the substrate.

Infusing Light Reflective Particles

An additional method for forming a white appearing anodized film involves infusing light reflective white particles within small openings of the anodized film such that the anodized film takes on a white appearance. In some cases, the openings are anodic pores that are naturally formed within the anodized film during the anodizing process. In other cases, the openings are created within the anodized film using, for example, a laser cracking process or a laser drilling process.

The light reflective particles can be any suitable particles that have multiple visible light reflecting surfaces for diffusely and specularly reflect substantially all wavelengths of visible light and to give the light reflective particles a white color. In some embodiments, alumina ($Al_2O_3$) or titania ($TiO_2$), or a combination of alumina and titania, are used. The average size of the light reflective particles can depend partially on the size of the openings in which the light reflective particles are infused within. For example, larger particles may not be able to fit within small opening, in which case, smaller particles are used. The light diffusing particles should also be of a size that optimally diffusely and specularly reflects visible light. In one embodiment using titania particles, an average particle diameter in the range of about 150 to 350 nanometers is used.

Figure 15A:
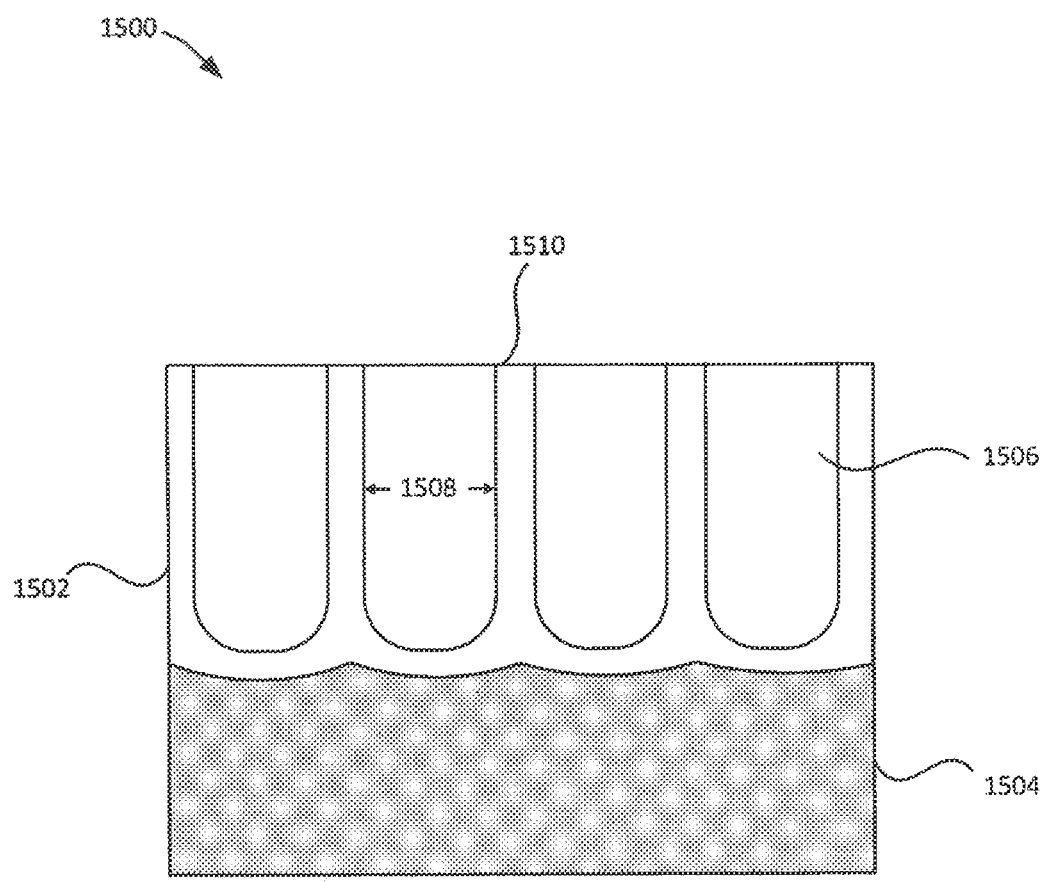
FIGS. 15A-15C illustrate cross section views of a part undergoing a pore infusion process.
Figure 15B:
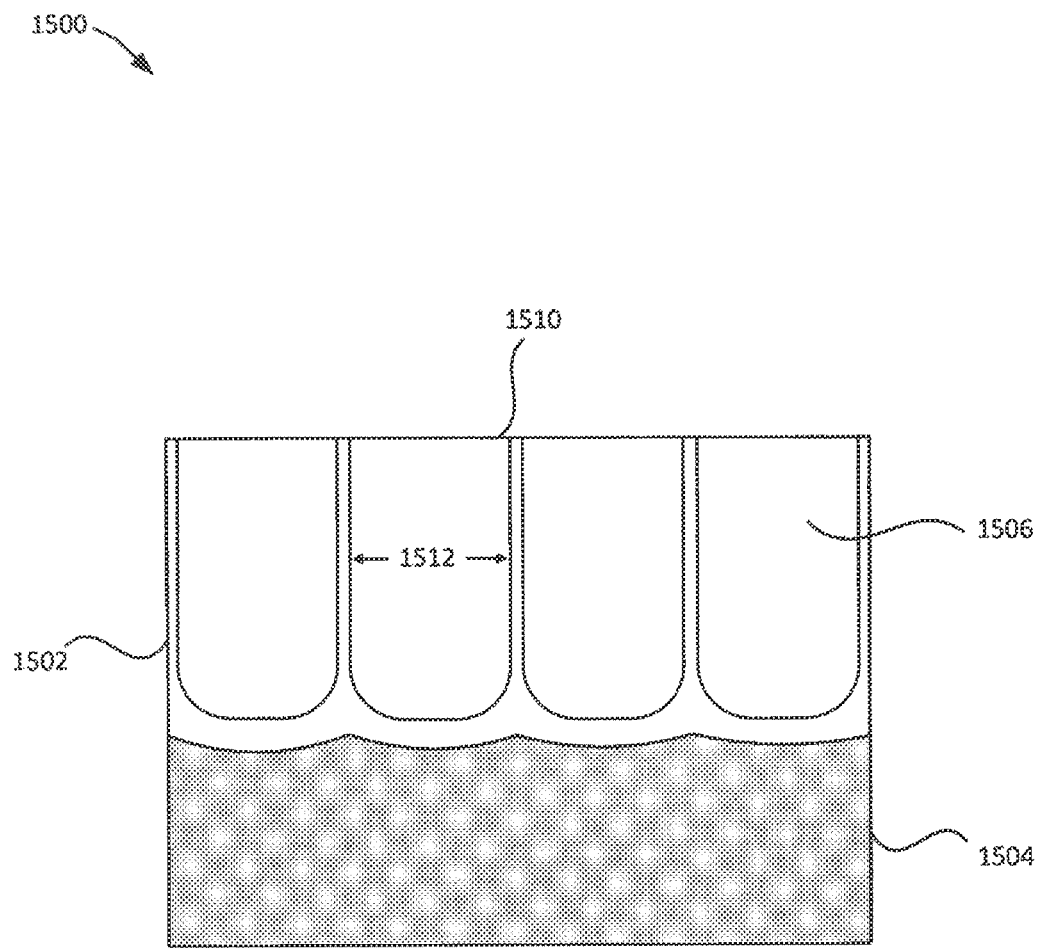
Figure 15C:
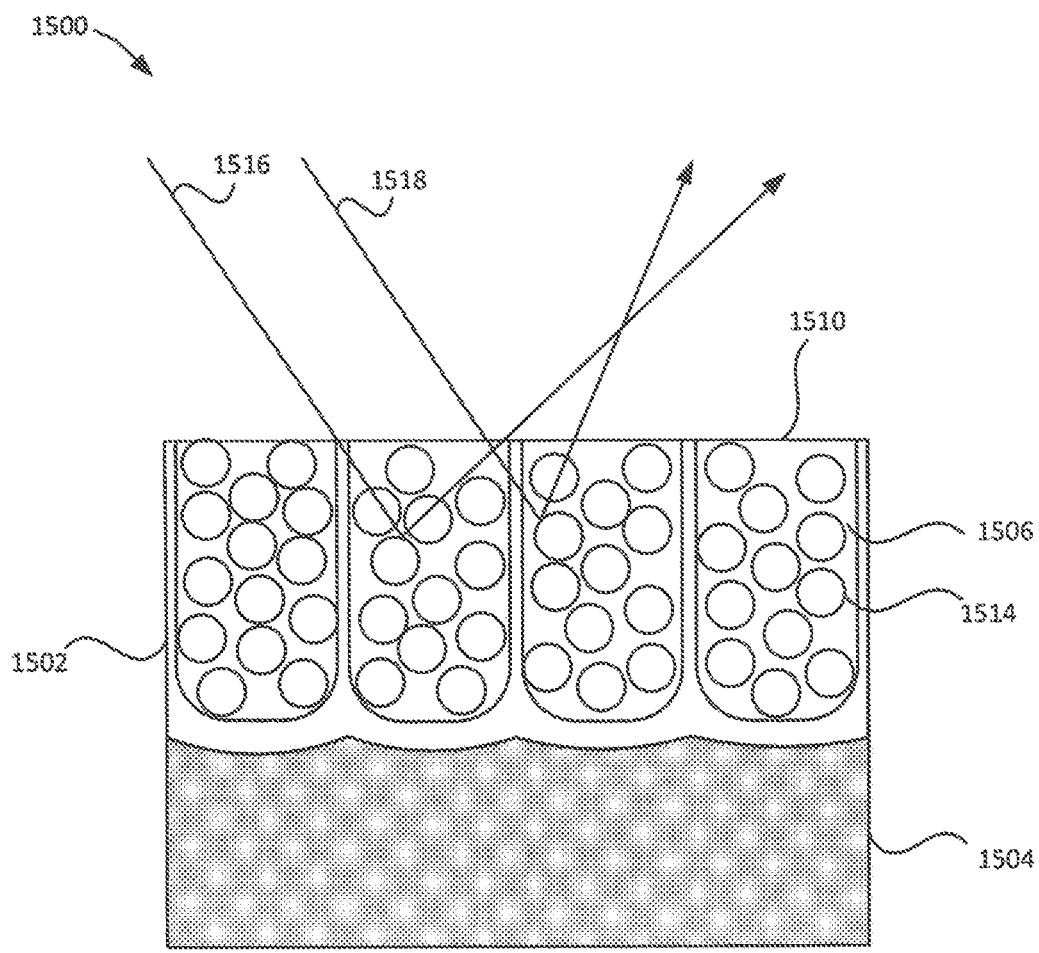

FIGS. 15A-15C illustrate cross section views of part 1500 undergoing a pore infusion process, in accordance with some embodiments. At 15A, part 1500 has undergone an anodizing process to convert a portion of metal substrate 1504 to anodized layer 1502. Pores 1506 form naturally during the anodizing process in elongated shapes with top ends opened at surface 1510 and bottom ends proximate to underlying substrate 1504. The average diameter 1508 of pores 1506 for a typical anodizing film ranges from about 10 to 130 nanometers, depending on the electrolyte used. At 15B, pores 1506 are optionally widened to a larger average diameter 1512. In some embodiments, pores 1506 are widened to average diameter 1512 of greater than about 100 nanometers, in some cases to around 150 nanometers or more. Any suitable pore widening process can be used. For example, subjecting part 1500 to an acidic solution can widen pores 1506.

At 15C, pores 1506 are partially or completely filled with light reflective particles 1514. The infusing of pores 1506 with light reflective particles 1514 can be accomplished using any of a number of suitable techniques. For example, a sedimentation process, a pressing process, an electrophoresis process, or a PVD process can be used, which are described in detail below. After pores 1506 are partially or completely filled, they are optionally sealing using any suitable pore sealing process. Since light reflective particles 1514 are white by diffusely reflecting visible light, they can impart white appearance to anodized layer 1506. For example, light ray 1516 reflecting off a first surface of light reflective particles 1514 exits at top surface 1510 at a first angle, while light ray 1518 coming in at the same angle as light ray 1516 reflects off a second surface of light reflective particles 1514 and exits at top surface 1510 at a second angle different from the first angle. In addition, any bright specular reflective qualities that light reflective particles 1514 possess are also maintained while within pores 1506, giving anodized layer 1506 a bright white appearance.

Figure 16A:
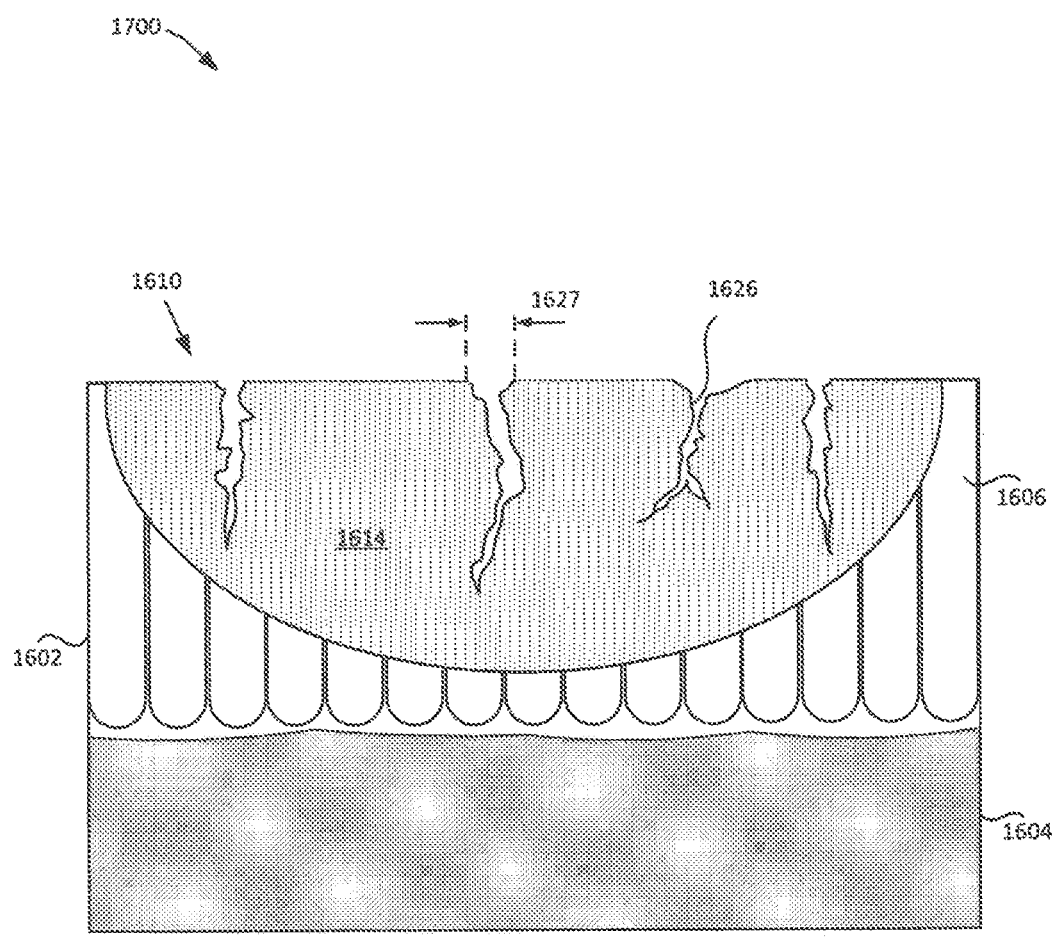
FIGS. 16A and 16B illustrate cross section views of a part undergoing a micro-crack infusion process.
Figure 16B:
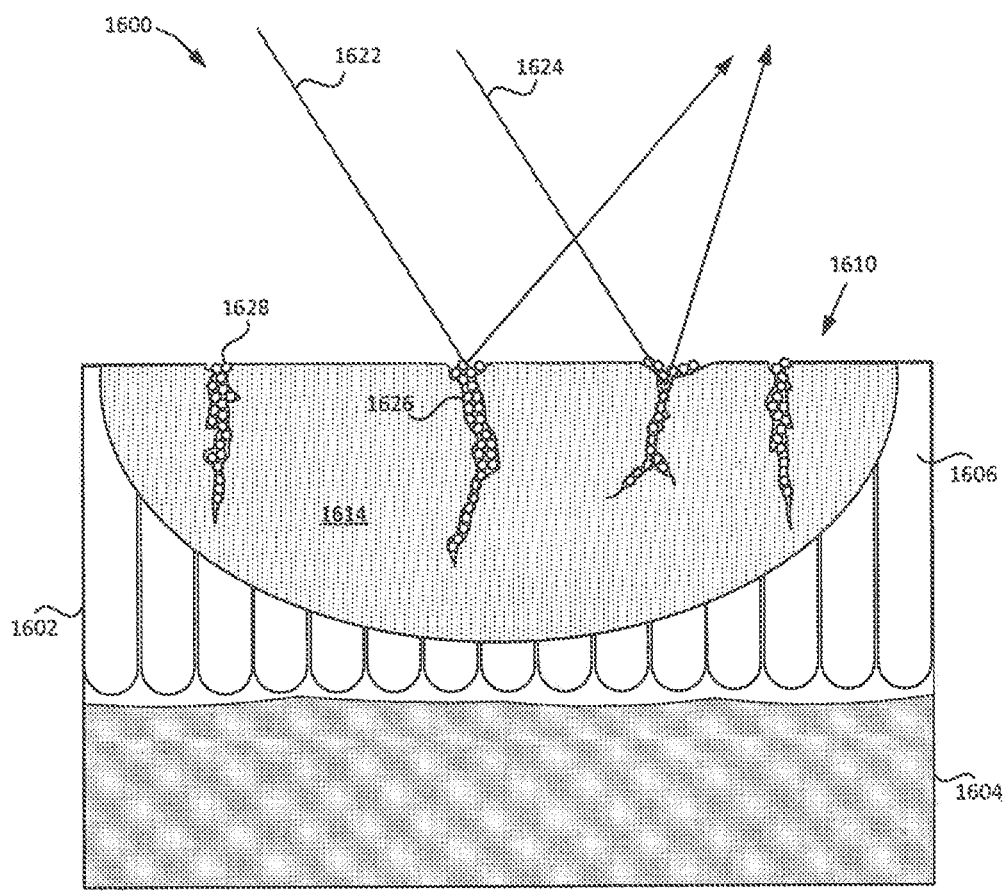

FIGS. 16A and 16B illustrate cross section views of part 1600 undergoing a micro-crack infusion process, in accordance with some embodiments. At 16A, part 1600 has undergone a laser cracking procedure, such as the laser cracking procedures described above with reference to FIGS. 7-12. As shown, pores 1606 of anodized layer 1602, situated over underlying substrate 1604, have been modified within spot area 1614. Spot area 1614 corresponds to an area exposed to a pulse of a laser beam. Micro-cracks 1626 are formed as a result of localized heating from the laser beam and subsequent cooling of the aluminum oxide material within spot area 1614. In some embodiments, micro-cracks have an average width 1627 ranging from about 100 nanometers to about 600 nanometers.

At FIG. 16B, light reflective particles 1628 are infused within cracks 1626 using any of a number of suitable techniques, such as those described below. Since width of micro-cracks 1626 can be larger than the average diameter of typical pores, the size of light reflective particles 1628 can be larger than those used in the pore infusion embodiment described above with reference to FIGS. 15A-15C. Light reflective particles 1628 diffusely reflect light, imparting a white appearance to anodized layer 1602. For example, light rays 1622 and 1624 reflect off a first surface and a second surface, respectively, of light reflective particles 1628 at a first angle and a second angle, respectively. In addition, any bright specular reflective qualities that light reflective particles 1628 possess can contribute a bright specular quality to anodized layer 1606.

Figure 17A:
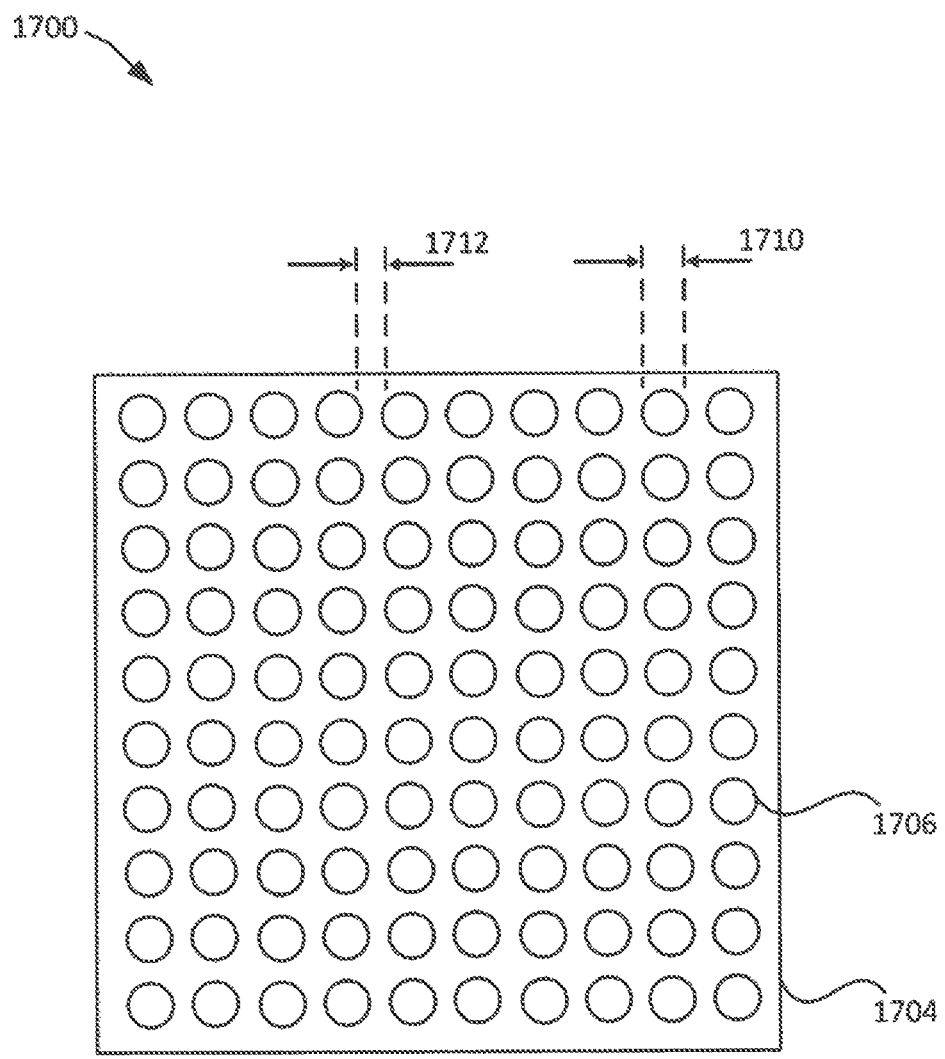
FIGS. 17A-17D illustrate top-down and cross section views of a part undergoing laser drilling, anodizing and light reflective particle infusion processes.
Figure 17B:
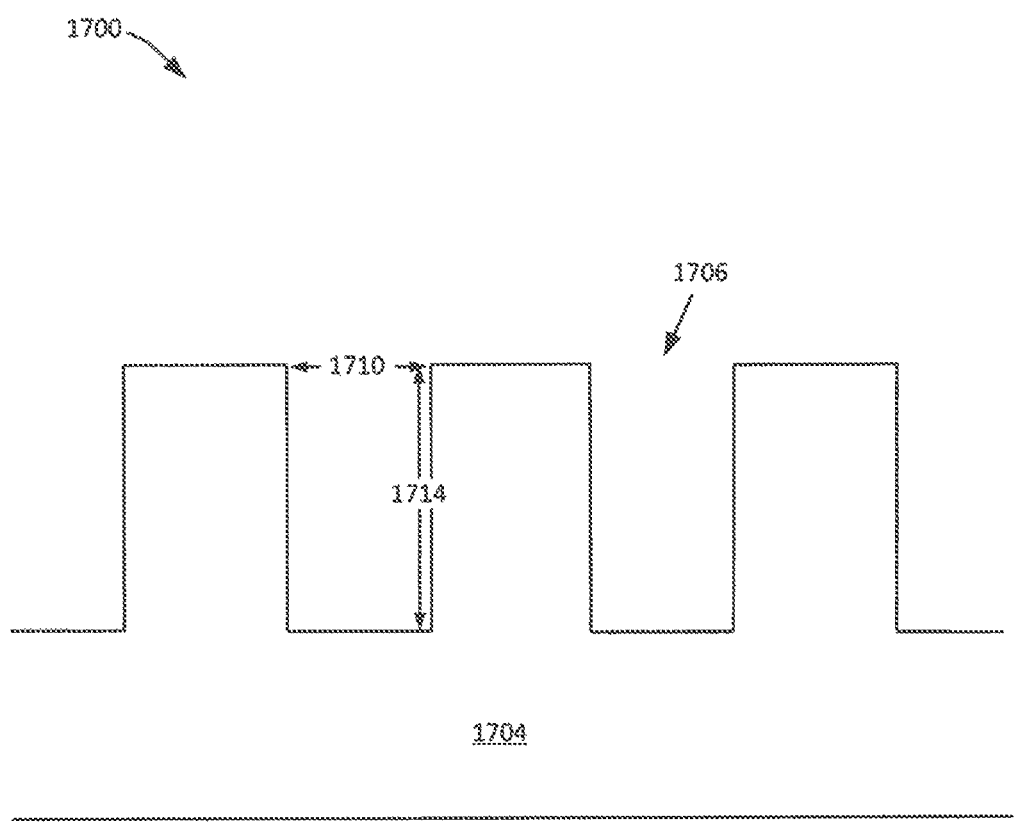

FIGS. 17A-17D illustrate top-down and cross section views of part 1700 undergoing laser drilling and light reflective particle infusion processes, in accordance with some embodiments. FIG. 17A shows a top-down view of part 1700 with metal substrate 1704 having undergone a laser drilling process, whereby directing a laser beam at metal substrate 1704 produces an array of holes 1706. In some embodiments, a pulsed laser system is used where each laser beam pulse corresponds to each hole 1706. In other embodiments, multiple pulses of a laser beam form each hole 1706. In some embodiments, a pulsed laser beam is raster scanned over substrate 1704. Holes 1706 can be arranged in an ordered array, such as shown in FIG. 17A, or in a random pattern where holes 1706 are randomly distributed within metal substrate 1704. In some embodiments, holes 1706 have an average diameter 1710 ranging from about 1 micron to about 20 microns. Suitable pitch 1712 between holes 1706 can also be selected. In some embodiments pitch 1712 can be on the scale of average hole diameter 1710. Any suitable laser of producing a laser beam having a power and wavelength range for drilling holes within metal substrate 1704 can be used. FIG. 17B illustrates a close-up cross section view of holes 1706 within metal substrate 1704. Depth 1714 of openings 1706 can vary depending on particular applications.

Figure 17C:
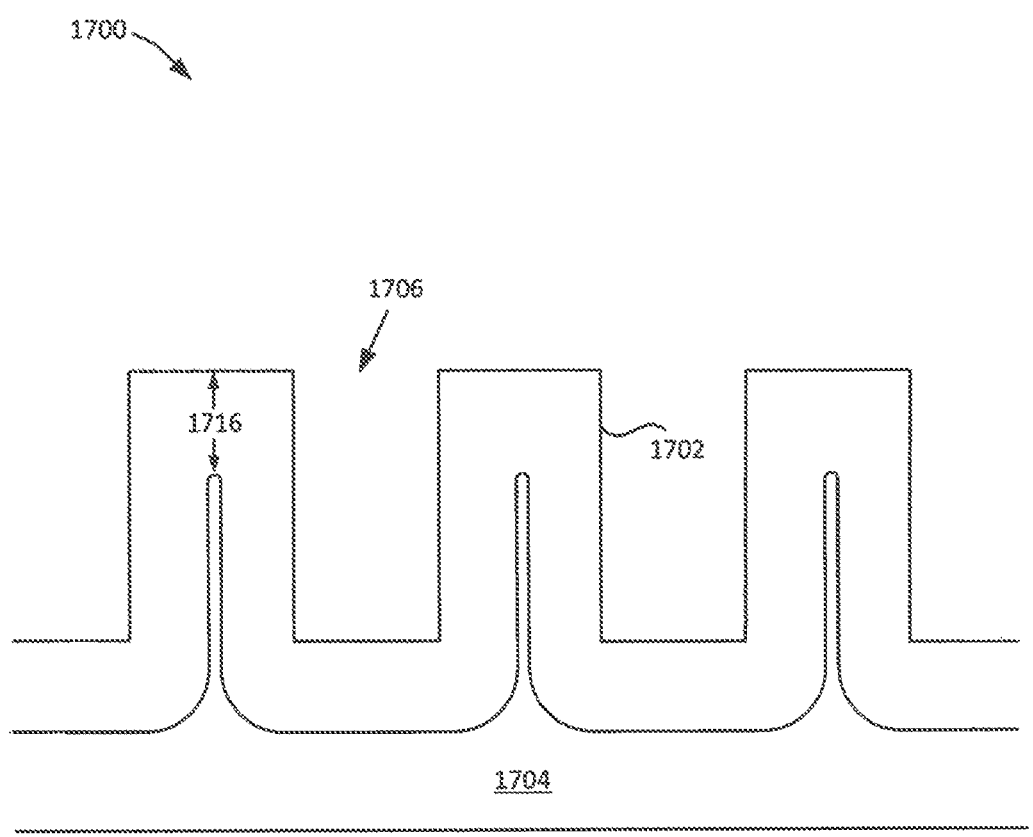
Figure 17D:
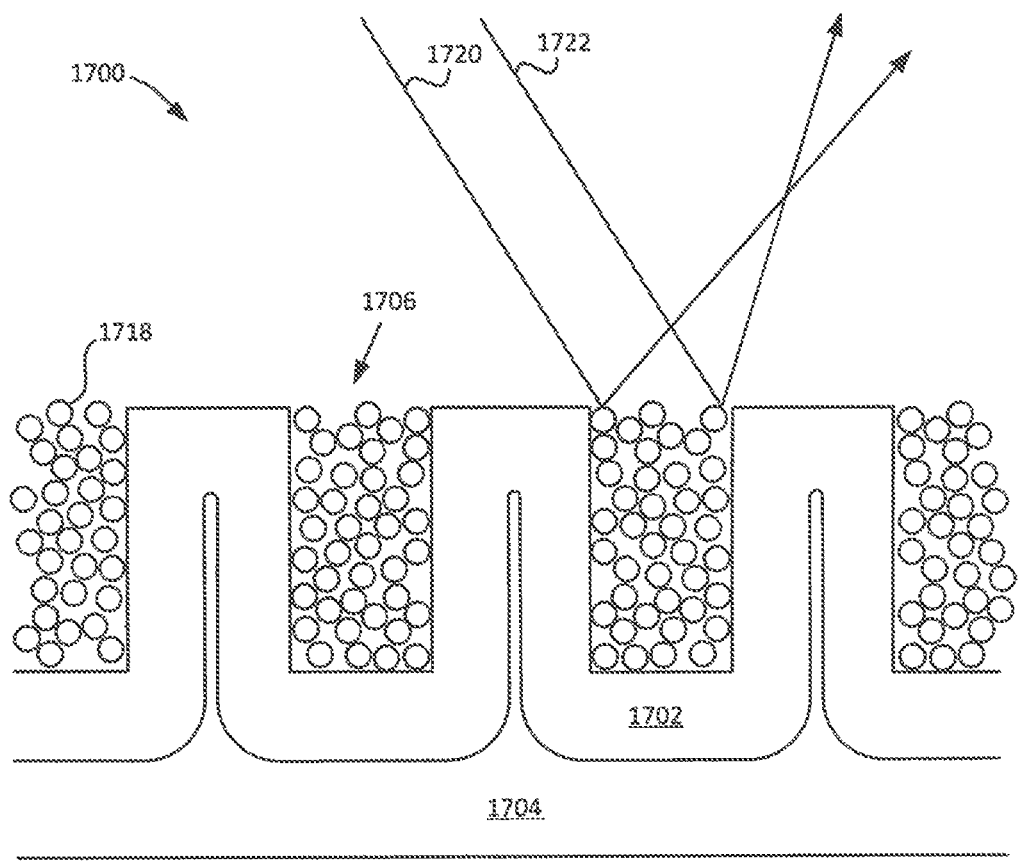

At FIG. 17C, part 1700 has undergone an anodizing process whereby a portion of metal substrate 1704 is converted to anodized layer 1702. In some embodiments, anodized layer 1702 has a thickness 1716 ranging from about 15 microns to about 35 microns, depending on application requirements. As shown, anodized layer 1702 substantially conforms to the shape of metal substrate 1704 such that holes 1706 having a size and a shape appropriate for accommodating light reflective particles exist within anodized layer 1702. At FIG. 17D, holes 1706 are partially or completely infused with light reflective particles 1718 using any of a number of suitable techniques, such as those described below. Light reflective particles 1718 diffusely reflect light, imparting a white appearance to anodized layer 1702. For example, light rays 1720 and 1722 reflect off a first surface and a second surface, respectively, of light reflective particles 1718 at a first angle and a second angle, respectively. In addition, any bright specular reflective qualities that light reflective particles 1718 possess can contribute a bright specular quality to anodized layer 1702.

As described above, a number of suitable techniques can be used to infuse light reflective particles within openings, such as pores, cracks and laser drilled holes, within an anodized film. One technique for infusing light reflective particles within openings of an anodized film involves a sedimentation process, whereby the force of gravity moves the light reflective particles within the openings. The sedimentation technique involves placing the substrate into a slurry containing the light reflective particles. The force of gravity sinks the light reflective particles into the bottom of the openings of the anodized film. The slurry is then heated to allow the liquid portion of the slurry to evaporate, leaving the light reflective particles within the openings. In another variation, prior to exposing the substrate to the slurry, a vacuum desiccator is used to vacuum out air and create a vacuum pressure within the openings where the light reflective particles will be drawn into.

Another technique for infusing light reflective particles within openings of an anodized film involves a pressing technique, whereby the light reflective particles are physically forced within the openings. In one embodiment, a substrate is placed into a slurry containing the light reflective particles. A fixture, such as a rubber roller, is then used to press the light reflective particles into the openings of the anodized film. Next, the liquid portion of the slurry is allowed to evaporate, leaving the light reflective particles within the openings. As with the sedimentation technique described above, a vacuum enhanced variation can be applied, whereby the substrate is placed in a vacuum desiccator prior to exposure to the slurry and the pressing operation.

Figure 18:
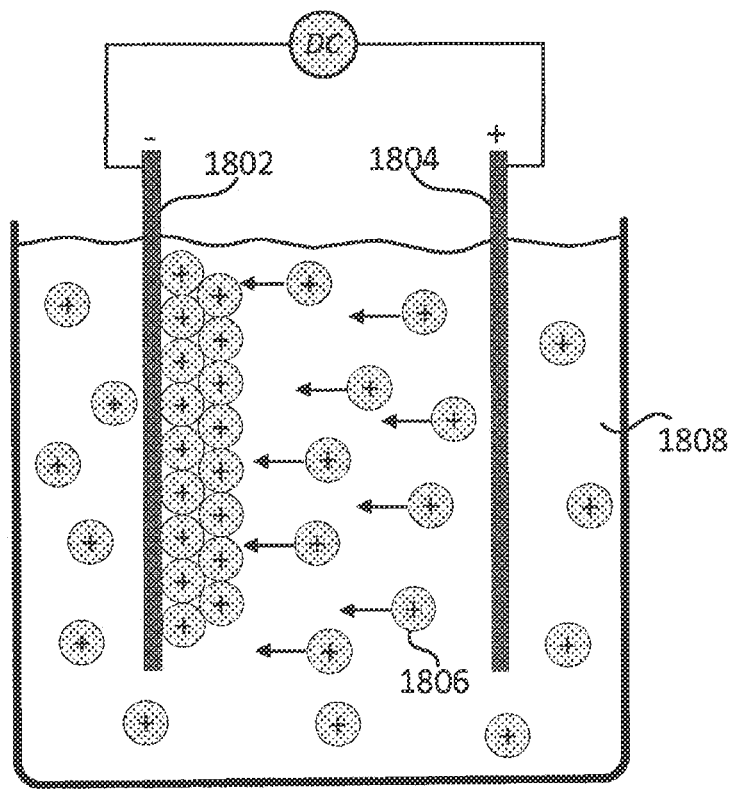
FIG. 18 illustrates a light reflecting particle pore infusion process using an electrophoresis technique.

An additional technique for infusing light reflective particles within openings of an anodized film involves an electrophoresis technique, whereby the light reflective particles are attracted within the openings by electrophoresis. FIG. 18 shows electrolytic assembly 1800 illustrating an electrophoresis process whereby a DC voltage is applied across negatively charged cathode 1802 and positively charged anode 1804, creating an electric field within electrolytic bath 1808. In this case, cathode 1802 acts as a substrate. Light reflective particles 1806 are added to electrolytic bath 1808 and take on a positive charge, opposite cathode substrate 1802. As such, light reflective particles 1806 migrate though electrolytic bath 1808 toward cathode substrate 1802 and within any openings within the surface of cathode substrate. When the voltage is removed, the light reflective particles remain within the openings. Note that in other embodiments, the anode can act as the substrate, with negatively charged light particles attracted to the positive anode substrate. In one embodiment, the light reflective particles are titania ($TiO_2$), which can take on a positive charge within an electrolytic solution, and are attracted to a cathode substrate.

Another technique for infusing light reflective particles within openings of an anodized film involves a PVD technique, whereby the light reflective particles are sputtered onto the substrate. When the light reflective particles are sputtered onto the substrate, some of the light reflective particles become embedded within the openings. After the PVD process is complete, a separate process for removing excess portions of light reflective material, i.e., material deposited at surface, can be removed, thereby leaving the openings filled with light reflective particles.

Figure 19:
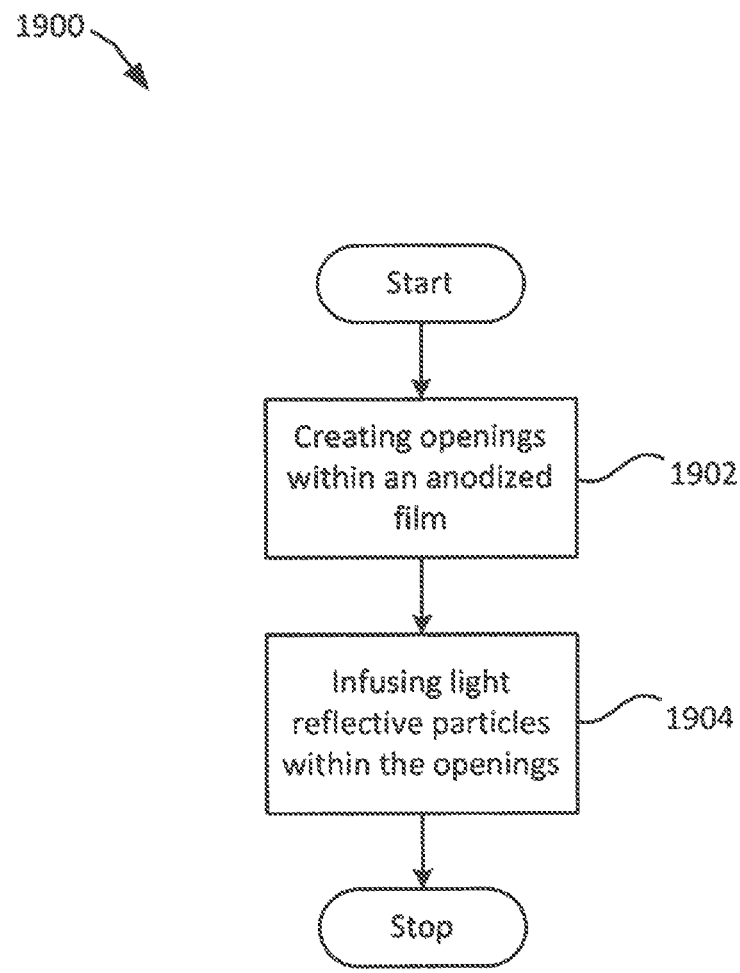
FIG. 19 shows a flow chart indicating steps for forming a white anodized film by infusing light reflective particles within openings of the anodized film.

FIG. 19 shows flowchart 1900 indicating steps for forming a white anodized film by infusing light reflective particles within openings of the anodized film. At 1902, openings are created within an anodized film. In some embodiments, the openings are the pores that are concurrently formed with growth of the anodized film. In other embodiments, the openings are formed using a separate procedure, such as a laser cracking or a laser drilling procedure. The openings should be sized and shaped suitable for accommodating light reflective particles. At 1904, light reflective particles are infused within the openings of the anodized film. Any suitable infusion technique can be used. For example, a sedimentation process, a pressing technique, an electrophoresis technique, or a PVD technique described above can be used.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An enclosure for a portable electronic device having a white appearance, comprising:
    a metal substrate;
    an anodized layer that overlays the metal substrate, wherein the anodized layer includes (i) pores, and (ii) spot areas having micro-cracks; and
    light reflective particles that are infused within the micro-cracks, wherein the light reflective particles include light reflective surfaces such that when visible light is incident upon an external surface of the anodized layer, the light reflective surfaces diffusely reflect the visible light in multiple different directions.

2. The enclosure of claim 1, wherein the spot areas are comprised of crystallized metal oxide.

3. The enclosure of claim 1, wherein the light reflective particles include titania or alumina.

4. The enclosure of claim 1, wherein a width of the micro-cracks is greater than an average diameter of the pores.

5. The enclosure of claim 1, wherein the anodized layer further includes light translucent areas having the pores, and the light translucent areas are separated by the spot areas.

6. The enclosure of claim 5, wherein the spot areas include irregularly shaped pores.

7. The enclosure of claim 1, wherein the micro-cracks have an average width between about 100 nm to about 600 nm.

8. The enclosure of claim 1, wherein the spot areas are substantially uniformly spaced apart from each other.

9. The enclosure of claim 1, wherein an average distance between the spot areas is equal to an average diameter of the spot areas or less.

10. A part for a portable electronic device, comprising:
   a metal substrate;
   an anodized layer includes (i) light translucent portions, and (ii) light diffusing portions separated by the light translucent portions, wherein the light diffusing portions include micro-cracks; and
   light reflective particles that are infused within the micro-cracks, wherein the light reflective particles include a textured surface such that when visible light is incident upon an external surface of the anodized layer, the textured surface diffusely reflects the visible light in multiple different directions.

11. The part of claim 10, wherein the light diffusing portions include crystallized metal oxide material.

12. The part of claim 10, wherein the micro-cracks have an average width between about 100 nm to about 600 nm.

13. The part of claim 10, wherein the light translucent portions are without the micro-cracks.

14. The part of claim 10, wherein the light reflective particles include alumina or titania.

15. The part of claim 10, wherein the light diffusing portions are uniformly separated from each other.

16. A method for forming an enclosure, the method comprising:
   forming an anodized layer over a metal substrate;
   forming spot areas within the anodized layer by (i) heating metal oxide material of the anodized layer, and (ii) cooling the metal oxide material that was heated to form micro-cracks; and
   infusing light reflective particles within the micro-cracks, wherein the light reflective particles include multiple light reflective surfaces.

17. The method of claim 16, wherein the light reflective particles include alumina or titania.

18. The method of claim 16, wherein the anodized layer further includes light translucent areas having pores, and the light translucent areas are separated by the spot areas.

19. The method of claim 16, wherein the micro-cracks have an average width between about 100 nm to about 600 nm.

20. The method of claim 16, wherein the spot areas are substantially uniformly spaced apart from each other.

* * * * *